(12) United States Patent
Gong et al.

(10) Patent No.: US 12,323,290 B2
(45) Date of Patent: Jun. 3, 2025

(54) HIERARCHICAL AUTO SUMMARY GENERATION WITH MULTI-TASK LEARNING IN NETWORKING RECOMMENDATIONS

(71) Applicant: Cisco Technology, Inc., San Jose, CA (US)

(72) Inventors: Qixu Gong, Santa Clara, CA (US); Benjamin L Chang, Saratoga, CA (US); Qihong Shao, Clyde Hill, WA (US); Derek William Engi, Pleasant Ridge, MI (US); Jaime Madruga Rita, Rolesville, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 12 days.

(21) Appl. No.: 18/184,972

(22) Filed: Mar. 16, 2023

(65) Prior Publication Data

US 2024/0314020 A1  Sep. 19, 2024

(51) Int. Cl.
*H04L 41/0631* (2022.01)
*H04L 41/069* (2022.01)
*H04L 41/16* (2022.01)

(52) U.S. Cl.
CPC .......... *H04L 41/065* (2013.01); *H04L 41/069* (2013.01); *H04L 41/16* (2013.01)

(58) Field of Classification Search
CPC ...... H04L 41/065; H04L 41/069; H04L 41/16
USPC ........................................................ 709/223
See application file for complete search history.

(56) References Cited

U.S. PATENT DOCUMENTS

| | | | |
|---|---|---|---|
| 9,378,200 B1 | 6/2016 | Cohen et al. | |
| 2012/0185945 A1* | 7/2012 | Andres | G06F 21/568 |
| | | | 726/25 |
| 2016/0234242 A1* | 8/2016 | Knapp | G06F 21/55 |
| 2017/0004205 A1 | 1/2017 | Jain et al. | |

(Continued)

OTHER PUBLICATIONS

Du, Constructing Contrastive samples via Summarization for Text Classification with limited annotations, Nov. 29, 2021, https://arxiv.org/pdf/2104.05094 (Year: 2021).*

(Continued)

*Primary Examiner* — Zi Ye
(74) *Attorney, Agent, or Firm* — Edell, Shapiro & Finnan, LLC

(57) ABSTRACT

Methods are provided for generating hierarchical summaries with actionable recommendations having various granularities. Specifically, the methods involve obtaining notifications related to network issues and generating meta-semantic data that includes a summary of each of the notifications. The methods further involve obtaining inventory data of network devices in a plurality of domains of a network. The inventory data includes configuration information of the network devices. The methods further involve generating a multi-level hierarchical summary specific to the network based on the inventory data and the meta-semantic data. The multi-level hierarchical summary includes a first level specific to one or more affected network devices and a second level specific to a group of network devices. The methods further involve providing the multi-level hierarchical summary for performing one or more actions associated with the network.

20 Claims, 15 Drawing Sheets

(56) References Cited

U.S. PATENT DOCUMENTS

2022/0036175 A1 2/2022 Krishnamurthy et al.
2022/0200928 A1 6/2022 Garrison et al.
2022/0345489 A1 10/2022 Karabey et al.

OTHER PUBLICATIONS

Mignacca, How to Use Domain Scanning for Vulnerability Management, Feb. 15, 2023, https://www.cavelo.com/blog/use-domain-scanning-for-vulnerability-management (Year: 2023).*

Kan, A Unified Generative Framework based on Prompt Learning for Various Information Extraction Tasks, Sep. 23, 2022, https://arxiv.org/pdf/2209.11570 (Year: 2022).*

Gonçalves, L. "Automatic Text Summarization with Machine Learning—An overview," Luisfredgs, https://medium.com/luisfredgs/automatic-text-summarization-with-machine-learning-an-overview-68ded5717a25, Apr. 12, 2020, 11 pages.

Zhang, J., et al., "Pegasus: Pre-training with Extracted Gap-sentences for Abstractive Summarization," ICML'20: Proceedings of the 37th International Conference on Machine Learning, Article No. 1051, https://dl.acm.org/doi/10.5555/3524938.3525989, Jul. 10, 2020, 55 pages.

Caruana, R., "Multitask Learning*," School of Computer Science, Carnegie Mellon University, https://link.springer.com/article/10.1023/A:1007379606734, Jul. 1997, 35 pages.

Fabbri, A., et al., "Multi-News: a Large-Scale Multi-Document Summarization Dataset and Abstractive Hierarchical Model," Department of Computer Science, Yale University, https://aclanthology.org/P19-1102/, Jul. 2019, 11 pages.

Liu, Y., et al., "Brio: Bringing Order to Abstractive Summarization," https://www.researchgate.net/publication/359648385_BRIO_Bringing_Order_to_Abstractive_Summarization, Mar. 2022, 14 pages.

Ma, N., et al., "An Online Multi-task Learning Framework for Google Feed Ads Auction Models," ACM SIGKDD Conference on Knowledge Discovery and Data Mining, https://doi.org/10.1145/3534678.3539055, Aug. 2022, 9 pages.

Chen, S., "Multi-Task Learning in Natural Language Processing: An Overview," https://arxiv.org/abs/2109.09138, Sep. 2021, 30 pages.

Cisco, "Product Field Notice Summary," https://www.cisco.com/c/en/US/support/web/tsd-products-field-notice-summary.html, retrieved from the Internet Jan. 10, 2023, 12 pages.

Cisco, "Cisco PSIRT OpenVuln API," Introduction to the Cisco PSIRT openVuln API, https://developer.cisco.com/psirt/, retretieved from the Internet Jan. 10, 2023, 3 pages.

Cisco, "Field Notice Overview," Support, Field Notices, https://www.cisco.com/c/en/us/support/web/field-notice-overview.html, retrieved from the Internet Mar. 16, 2023, 6 pages.

* cited by examiner

| ORIGINAL NOTIFICATION 502 | | | DOMAIN LABELED DATA 510 | | | | |
|---|---|---|---|---|---|---|---|
| BULLETIN SUMMARY | SCORE | TYPE | EXPERT SUMMARY 512a | SOLUTIONS 512b | NCE SEVERITY SCORE (0-10) 512c | URGENCY SCORE (0-10) 512d | KEYWORDS 512e |
| Unstructured data FIELD NOTICE Vulnerability of devices x, y, z Versions: a, b, c Description of vulnerabilities and impact | 10 | Critical | A vulnerability in an external library can affect enterprise products. This vulnerability provides a remote code exploitation. | The majority of the products affected by this vulnerability are management interfaces and platforms for Enterprise infrastructure, but not the hardware devices themselves. Since this exploit is remotely executed and will affect many systems, priority should be taken to address devices where there is external vector. Adequate compensating controls should be applied to limit the ability for anonymous connectivity to affected systems until a workaround is applied. A known exploit / test code has been seen in the wild, raising the urgency of addressing the issue. | 7 | 8 | log4j, critical vulnerability, remote code exploitation, management products |

FIG.5

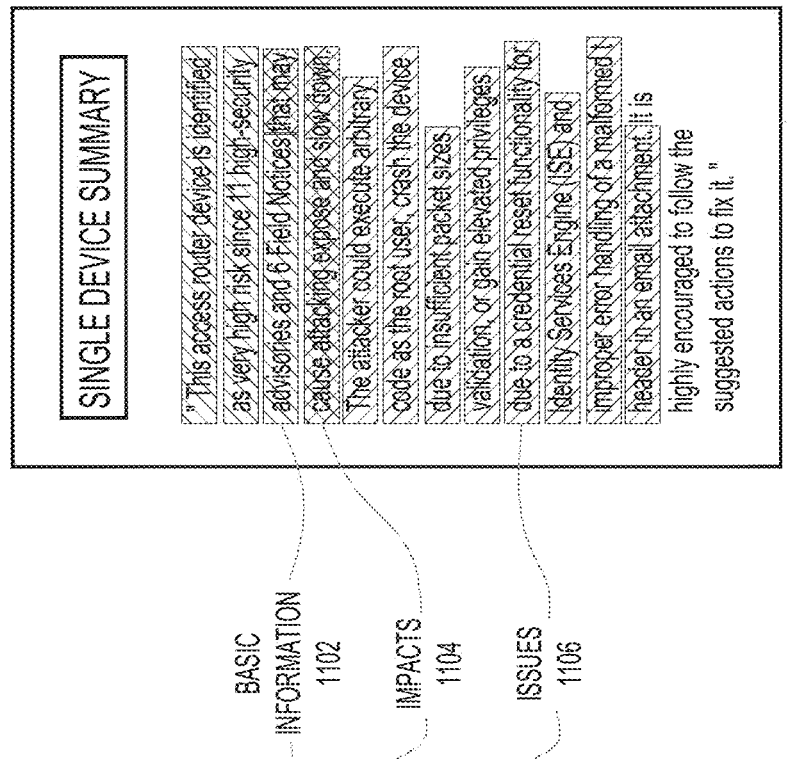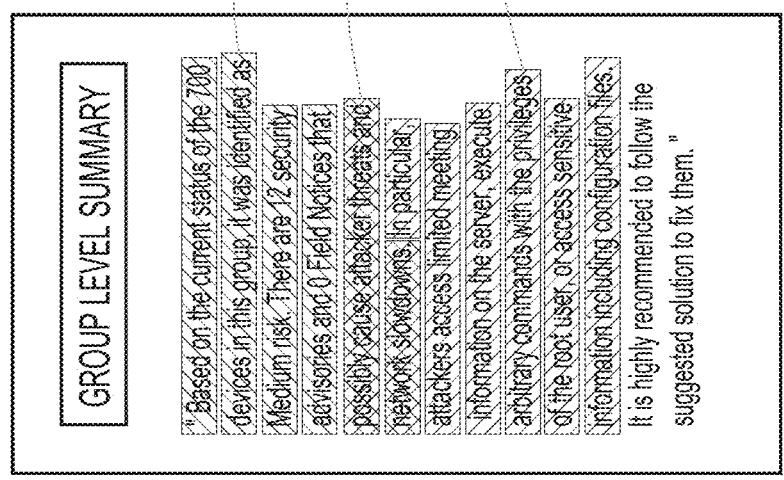
FIG.11

HIERARCHICAL AUTO SUMMARY GENERATION WITH MULTI-TASK LEARNING IN NETWORKING RECOMMENDATIONS

TECHNICAL FIELD

The present disclosure generally relates to computer networks and systems.

BACKGROUND

Enterprise networks include many assets and involve various enterprise service functions for equipment and software. Enterprise networks are often managed by a team of information technology (IT) specialists. This is particularly the case for enterprises that have large networks or systems of numerous instances and types of equipment and software. Tracking performance, troubleshooting, and integrating new technology and/or updates for networking or equipment and software in large enterprise networks is time consuming and often requires support and guidance from providers or third-party entities. Moreover, each asset or a group of assets may encounter various issues such as defects, obsolescence, configurations, workarounds, etc. Each issue has technical details. Many issues are reported from various vendors and other sources. Understanding and addressing these issues in the enterprise network is difficult and complicated.

BRIEF DESCRIPTION OF THE DRAWINGS

FIG. 5 is a view illustrating semantic data having network domain specific data labels for semantic learning, according to an example embodiment.

FIG. 11 is a view illustrating two levels of a multi-level hierarchical summary, according to an example embodiment.

DETAILED DESCRIPTION

Overview

Techniques presented herein provide a network hierarchical summary and recommendation service that generates hierarchical summaries with actionable recommendations for a network at various granularities.

In one form, the methods involve obtaining a plurality of notifications related to a plurality of network issues and generating meta-semantic data including a summary of each of the plurality of notifications. The methods further involve obtaining inventory data of a plurality of network devices in a plurality of domains of a network. The inventory data includes configuration information of the plurality of network devices. The methods further involve generating a multi-level hierarchical summary specific to the network based on the inventory data and the meta-semantic data. The multi-level hierarchical summary includes a first level specific to one or more affected network devices from the plurality of network devices and a second level specific to a group of network devices from the plurality of network devices. The method further involves providing the multi-level hierarchical summary for performing one or more actions associated with the network.

Example Embodiments

Figure 1:
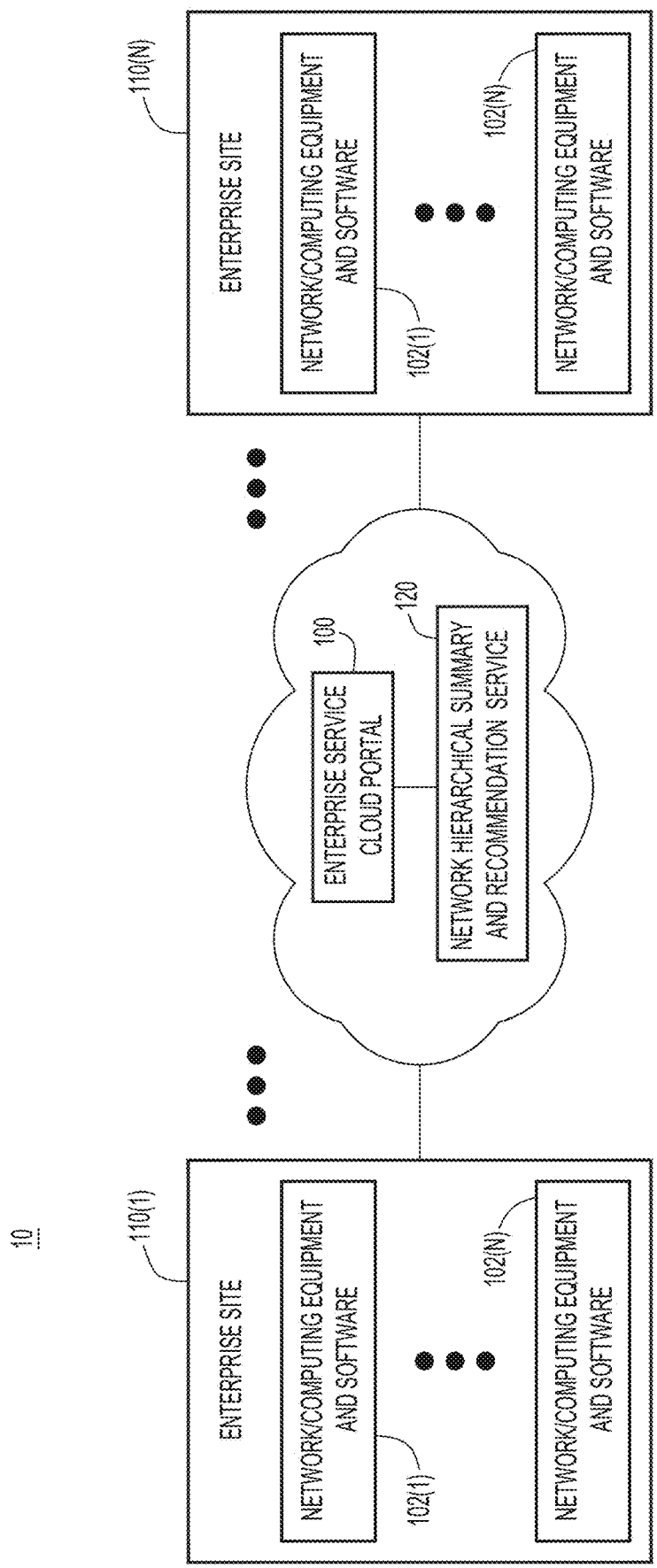
FIG. 1 is a block diagram of a system that includes a network hierarchical summary and recommendation service that interacts with an enterprise service cloud portal and network/computing equipment and software residing at various enterprise sites of an enterprise network domain, according to an example embodiment.

FIG. 1 is a block diagram of a system 10 that includes a network hierarchical summary and recommendation service 120 that interacts with an enterprise service cloud portal (cloud portal) 100 and network/computing equipment and software 102(1)-102(N) residing at various enterprise sites 110(1)-110(N), or in cloud deployments of an enterprise, according to an example embodiment.

The notations 1, 2, 3, . . . n; a, b, c, . . . n; "a-n", "a-d", "a-f", "a-g", "a-k", "a-e", and the like illustrate that the number of elements can vary depending on a particular implementation and is not limited to the number of elements being depicted or described. Moreover, this is only examples of various components, and the number and types of components, functions, etc. may vary based on a particular deployment and use case scenario.

The system 10 is one example of an enterprise network. The system 10 may involve multiple enterprise networks. The network/computing equipment and software 102(1)-102(N) are resources or assets of an enterprise (the terms "assets" and "resources" are used interchangeably herein).

The network/computing equipment and software 102(1)-102(N) may include any type of network devices or network nodes such as controllers, access points, gateways, switches, routers, hubs, bridges, gateways, modems, firewalls, intrusion protection devices/software, repeaters, servers, and so on. The network/computing equipment and software 102(1)-102(N) may further include endpoint or user devices such as a personal computer, laptop, tablet, and so on. The network/computing equipment and software 102(1)-102(N) may include virtual nodes such as virtual machines, containers, point of delivery (POD), and software such as system software (operating systems), firmware, security software such as firewalls, and other software products. The network/computing equipment and software 102(1)-102(N) may be in a form of software products that reside in an enterprise network and/or in one or more cloud(s). Associated with the network/computing equipment and software 102(1)-102(N) is configuration data representing various configurations, such as enabled and disabled features. The network/computing equipment and software 102(1)-102(N), located at the enterprise sites 110(1)-110(N), represent information technology (IT) environment of an enterprise.

The enterprise sites 110(1)-110(N) may be physical locations such as one or more data centers, facilities, or buildings located across geographic areas that designated to host the network/computing equipment and software 102(1)-102(N). The enterprise sites 110(1)-110(N) may further include one or more virtual data centers, which are a pool or a collection of cloud-based infrastructure resources specifically designed for enterprise needs, and/or for cloud-based service provider needs. Each enterprise site is a network domain, according to one example embodiment.

The network/computing equipment and software 102(1)-102(N) may send to the cloud portal 100, via telemetry techniques, data about their operational status and configurations so that the cloud portal 100 is continuously updated about the operational status, configurations, software versions, etc. of each instance of the network/computing equipment and software 102(1)-102(N) of an enterprise.

The cloud portal 100 is driven by human and digital intelligence that serves as a one-stop destination for equipment and software of an enterprise to access insights and expertise when needed and specific to a particular stage of an adoption lifecycle. Examples of capabilities include assets and coverage, cases (errors or issues to troubleshoot), automation workbench, insights with respect to various stages of an adoption lifecycle and action plans to progress to the next stage, etc. The cloud portal 100 helps the enterprise network technologies to progress along an adoption lifecycle based on adoption telemetry and enabled through contextual learning, support content, expert resources, and analytics and insights embedded in context of the enterprise's current/future guided adoption tasks.

A network technology is a computing-based service or a solution that solves an enterprise network or a computing problem or addresses a particular enterprise computing need. The network technology may be offered by a service provider to address aspects of information technology (IT). Some non-limiting examples of a network technology include access policies, security and firewall protection services, software image management, endpoint or user device protection, network segmentation and configuration, software defined network (SDN) management, data storage services, data backup services, data restoration services, voice over internet (VOIP) services, managing traffic flows, analytics services, etc. Some network technology solutions apply to virtual technologies or resources provided in a cloud or one or more data centers. The network technology solution implements a particular enterprise outcome and is often deployed on one or more of the network/computing equipment and software 102(1)-102(N).

An adoption of network technology solution refers to enterprise's uptake and utilization of a network technology for achieving a desired outcome. A journey refers to end-to-end activities performed by an enterprise when adopting a network technology including tasks they perform and defined stages to progress. An adoption lifecycle refers to a step-by-step guidance along the adoption journey to accelerate the speed to value of a network technology. The adoption lifecycle may encompass the end-to-end journey stages of: need, evaluate, select, align, purchase, onboard, implement, use, engage, adopt, optimize, recommend, advocate, accelerate, upgrade, renew, etc.

As noted above, various IT specialists (users) interact with the cloud portal 100 to manage network devices and software of the enterprise. There are many factors for a user to consider when building, operating, and maintaining enterprise network(s) and/or data center(s).

For example, an enterprise network may include dispersed and redundant sites such as the enterprise sites 110(1)-110(N) to support highly available services (e.g., network at various geographic locations). These enterprise sites 110(1)-110(N) include network/computing equipment and software 102(1)-102(N), which may be different hardware and software that host network services needed for the enterprise services (e.g., product families, asset groups). Different types of equipment run different features and configurations to enable the enterprise services.

Moreover, each device or group of devices may encounter various issues. In one example embodiment, these issues involve network related problems or potential problems. Network related problems may involve an outage, a latency problem, a connectivity problem, a malfunction of the network device or software thereon, and/or incompatibility or configuration related problems. In one example embodiment, issues may involve defects, obsolescence, configurations, workarounds, network patches, network information, etc. Issues may relate to warranties, licenses, or may be informational notices e.g., for a particular configuration or upgrade.

Network related issues are typically provided in a form of notifications. A notification includes technical details or information such as a brief description of the issue, its impact on an affected network device(s) and/or an enterprise service, a detailed description of the issue, and how to mitigate the issue. Notifications are advisories, reports, field notices, alerts, posts, etc. from various vendors and other sources. The notifications may be provided via email, an Internet post, and/or directly provided to enterprise network via a subscription service, for example. The notifications may be documents, files, etc. Notifications include data such as text, links, etc. Some notifications may be a text paragraph while others may include multiple pages of content.

For example, a first notification may be a document that covers one or more defects detected in affected network devices or software (e.g., a network service). A second notification may be an internet post that describes a security related issue and how to reconfigure the network device to mitigate a detected security vulnerability. A third notification may be an email that describes best practices and preferred configurations for a network asset such as the network device. A fourth notification may be a product guide (a pdf file) that describes general conditions that could adversely affect an enterprise network or one or more of its assets (network devices and/or network services). These are some non-limiting examples of various notifications encountered by an enterprise network.

Enterprises (e.g., IT specialists) need to monitor the enterprise network to ensure that the enterprise network remains secure and effective to run the enterprise services. The enterprises need to review notifications, determine if the notifications apply to their enterprise network and how (which site, which network devices, etc.), and determine whether actions are needed with respect to the configuration of the enterprise network and/or one or more of the potentially affected network devices. It is difficult, time consuming, and error prone for an enterprise to analyze and manage notifications (network related issues).

Moreover, because of the complexities of the network topology or structure (e.g., multiple network domains, diverse network devices and network services) and vast number of notifications, it is difficult to comprehend effectiveness of network services and/or vulnerabilities of the enterprise network and its network devices, as a whole. It is also difficult to comprehend a summary of network related issues that may impact an enterprise network and to generate an actionable plan for improving the enterprise network (mitigating network related vulnerabilities). Simply aggregating vast amount of information for an enterprise network is unworkable. It is difficult to generalize information that applies to a group of affected network resources and/or one or more enterprise sites (network domains) in the network and then specialize information that only applies to a particular network device in the network domain. By the time a user has completed analyzing one issue, the enterprise network may have changed in configuration, settings, etc. In other words, it is nearly impossible to obtain a summary of issues in an enterprise network in real-time. Further, it is difficult to determine which notifications should be prioritized.

To address at least some of these challenges, the network hierarchical summary and recommendation service 120 generates a hierarchical summary of network related issues in real-time and based on topology and configuration of a particular enterprise network. Specifically, a network hierarchical summary and recommendation service 120 performs semantic learning of the notifications such as unstructured documents and generates a granular summary of the network issues specific to the enterprise network in which the network issues are prioritized with recommendations having actionable task(s).

In one example embodiment, a recommendation may include one or more actionable tasks to be performed for configuring or managing the network. Each task includes one or more operations/actions. Recommendations are specifically tailored and prioritized based on the enterprise network, the enterprise sites 110(1)-110(N), and/or the network/computing equipment and software 102(1)-102(N). Further, the recommendations are granular i.e., on an enterprise network level, on a physical site level, on a group of devices level, specific to a particular device(s), and/or specific to a particular configuration(s) or network service(s).

At least some of the actions may be performed by the network hierarchical summary and recommendation service 120 or by the cloud portal 100 with the network hierarchical summary and recommendation service 120 such as changing a configuration of a particular network device(s), updating software asset(s) to a newer version, etc. The user is then notified that these automated actions were performed. The network hierarchical summary and recommendation service 120 may generate recommendations for performing the same action(s) on a group of devices (e.g. that run a particular service of the enterprise or use a particular network enterprise service) such as automatically installing the same security patch for a first network/computing equipment and software 102(1) and a second network/computing equipment 102(N), where the first network/computing equipment and software 102(1) and the second network/computing equipment and software 102(N) are similarly functioning devices located at different enterprise sites.

While one or more example embodiments describe hierarchical summaries, recommendations, and/or actionable tasks with respect to the cloud portal 100, this is just an example. Actionable tasks may involve other services and/or systems. In other words, actionable tasks may or may not involve the cloud portal 100. In one example embodiment, actionable tasks may include a first action that involves a network management platform for a first enterprise site 110(1) and a second action that involves a network controller of the network domain, and a third action that involves a direct connection to one of the network/computing equipment and software 102(1)-(N) at a second enterprise site 110(N). Actionable tasks may include actions that are performed in multiple management platforms and the like.

Figure 2:
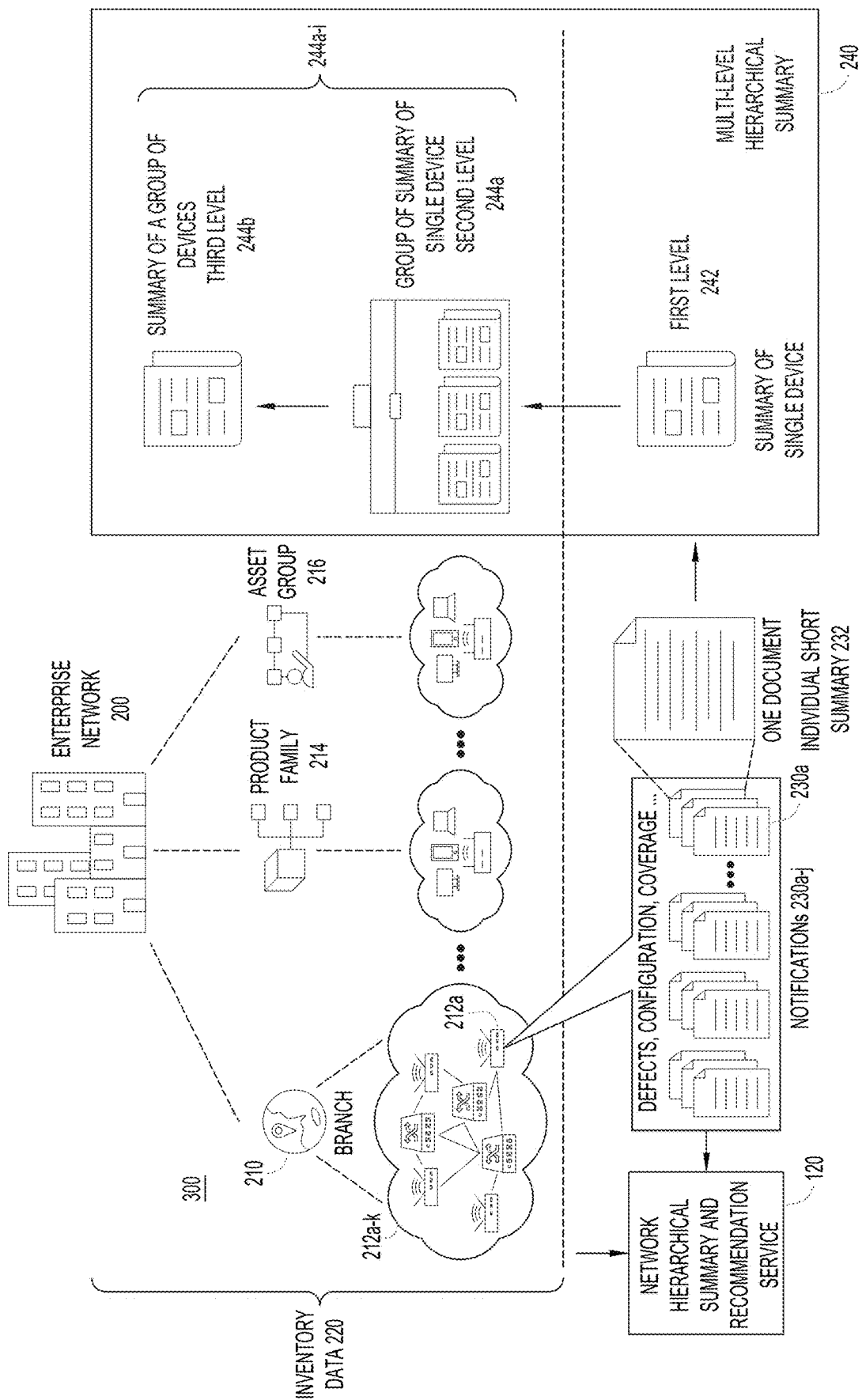
FIG. 2 is a diagram illustrating an enterprise network in which a network hierarchical summary and recommendation service is deployed, according to an example embodiment.

FIG. 2 is a diagram illustrating an enterprise network 200 in which the network hierarchical summary and recommendation service 120 of FIG. 1 is deployed, according to an example embodiment. Information about the enterprise network 200 is provided to the network hierarchical summary and recommendation service 120 as inventory data 220, which generates a multi-level hierarchical summary 240 based on the inventory data 220 and a plurality of notifications 230*a-j*.

The enterprise network 200 includes various network domains such as a branch 210, each of which includes various assets such as network devices 212*a-k*. The assets may be different types of resources such as the network/computing equipment and software 102(1)-102(N) of FIG. 1. Although not shown, other network domains also include various different assets such as routers, switches, access points, etc. The network devices 212*a-k* may be grouped by product family 214, similar configurations, similar current version of software, same enterprise network service being provided, similarly functioning devices (e.g., asset group 216), etc.

In one example embodiment, information about the enterprise network 200 is inventory data 220 that may be received from cloud portal 100 of FIG. 1 and/or directly from the enterprise network 200. The inventory data 220 may further include states of the network devices 212*a-k*, current network problems that may have been specifically encountered by these network devices 212*a-k*, and basic information such as functionality, product family, asset type, manufacturer, serial number, etc.

In addition to the inventory data 220, the network hierarchical summary and recommendation service 120 also obtains plurality of notifications 230*a-j* from various data sources (knowledge base). The notifications 230*a-j* may include information about a particular network device (such as a first network device 212*a*). For example, a notification may be a security alert, a bug notice, a defect notice, a security vulnerability report, etc. As another example, a notification may be a warranty coverage notice (e.g., support license for a specific network device is about to expire) or a configuration notice (e.g., devices executing software version A need to be upgraded to the software version B or a patch C needs to be installed).

The network hierarchical summary and recommendation service 120 analyzes the plurality of notifications 230a-j and determines which ones apply to the enterprise network 200 using the inventory data 220. The network hierarchical summary and recommendation service 120 then analyzes each notification (e.g., a first notification 230a specific to the first network device 212a) and generates an individual short summary 232. The individual short summary 232 includes a short description of the network issue(s) with key aspects of the first notification 230a. The individual short summary 232 may further include various metric values related to the network issue(s) such as severity, urgency, impact scores, etc.

Based on these individual short summaries for the applicable notifications, the network hierarchical summary and recommendation service 120 generates the multi-level hierarchical summary 240. The multi-level hierarchical summary 240 is a granular summary that is specific to the enterprise network 200. The multi-level hierarchical summary 240 is based on the inventory data 220 and meta-semantic data derived from the notifications 230a-j.

The multi-level hierarchical summary 240 includes a first level specific to a particular network device referred to as a summary of a single device 242 (e.g., for the first network device 212a) and additional levels of group summaries 244a-i. In one example, the summary of single device 242 may be a summary of a first network issue that applies to the first network device 212a obtained based on a set of notifications related to a first network issue (e.g., defect in configuration of a port on the first network device 212a). In another example, the summary of a single device 242 may include the individual short summary 232 of the first notification 230a that affects the first network device 212a.

Additional levels of the multi-level hierarchical summary 240 relate to group summaries 244a-i. For example, a second level 244a may include a group of summaries specific to the first network device 212a i.e., all network issues that affect the first network device 212a. A third level 244b may include a summary specific to a group of devices (e.g., all router type devices, all devices in the product family 214, devices in the asset group 216, etc.). A fourth level (not shown) may be specific to a particular network domain e.g., all network issues that apply to the branch 210 and a fifth level (not shown) may be specific to an enterprise service and/or the enterprise network 200, as a whole. The group summaries 244a-i are generated based on the individual short summaries.

The network hierarchical summary and recommendation service 120 thus quickly obtains the gist of the network issues in the enterprise network 200 in real-time and dynamically. The network hierarchical summary and recommendation service 120 also provides actionable recommendations to quickly address the network issues and may include actionable tasks that are then performed by the network hierarchical summary and recommendation service 120.

For example, a single notification (security alert, field notice, bug, etc.) may be too long to display on a user interface and includes detailed description that span multiple pages. The user would need to read the notification to understand the network issue therein. Due to the level of technical details in the notification, it may be hard for the user to comprehend the gist of the network issue. The individual short summary 232, on the other hand, provides the gist of the network issue (identifying key aspects and metrics). Additionally, the individual short summary 232 may omit inapplicable sections of the notification.

As another example, the first network device 212a and a group of network devices may have multiple network issues. The network hierarchical summary and recommendation service 120 determines how to summarize these multiple network issues by using a set of rules e.g., determines best granularities of the multiple network issues in the enterprise network 200. Depending on the network issues (e.g., quantity and complexity), the network hierarchical summary and recommendation service 120 determines whether to summarize the network issues at a single device level, at group of devices level, at the enterprise level, etc. The network hierarchical summary and recommendation service 120 further prioritizes the network issues such that the user is presented with urgent and/or critical network issues first e.g., lack of connectivity is prioritized over latency related issues. In one example embodiment, the user may select one or more levels of hierarchy to view. For example, a vice president of global operations or a line manager for a particular site or network domain, adjusts the view dynamically based on user's need such that the vice president adjusts the view for the enterprise network 200 as a whole while the line management adjusts the view for a particular site or network domain and various groups of devices therein.

Figure 3:
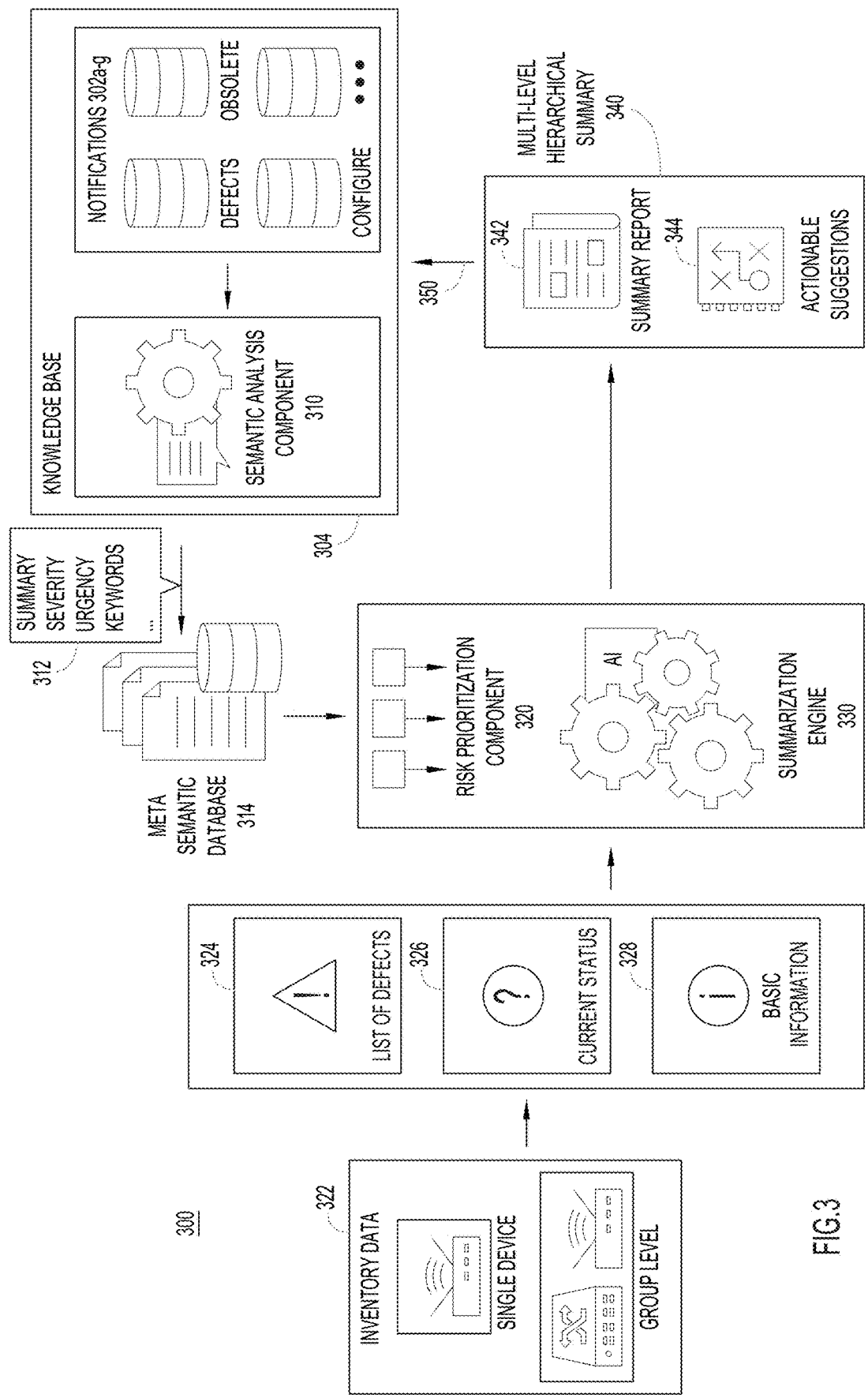
FIG. 3 is a block diagram illustrating components of a network hierarchical summary and recommendation service, according to an example embodiment.

FIG. 3 is a block diagram illustrating components 300 of the network hierarchical summary and recommendation service 120 of FIGS. 1 and 2, according to an example embodiment. The network hierarchical summary and recommendation service 120 includes a semantic analysis component 310, a risk prioritization component 320, and a summarization engine 330.

The semantic analysis component 310 involves dedicated contrastive learning and prompt learning to improve the performance of the summarization engine 330 and generalizes the scope of performance of the summarization engine 330 i.e., applies the processes to new types of notifications.

Specifically, the semantic analysis component 310 obtains notifications 302a-g (e.g., advisory documents, configuration documents, defects, etc.) from various disparate data sources i.e., a knowledge base 304. The data sources are data and information systems such as advisory information systems, electronic learning (e-learning) libraries, product guidance and documentation, support case management platforms, community forums, third party vendors, and content management systems.

The advisory information systems may be published by multiple service providers and include the notifications 302a-g such as security advisories, field notices, known bugs, published end of life milestones (end of sale, end of support, etc.) affecting one or more network devices (or other network assets), and other notices or contextual alerts. The knowledge base 304 may also provide general descriptions such as software types, releases, typically enabled and disabled features, and so on. E-learning libraries may provide content from a hosted provider(s) and/or a third party. The content relates to one or more network assets/resources including live and on-demand videos, e-courses, learning labs, etc. The product guidance and documentation include configuration guides, deployment guides, user manuals, and other product documentation. The support case management platforms include support cases opened against one or more network resources and an ability to contextually trigger generating a new support case via an asset/resource entitlement. The support cases are for various enterprises and identify issues or difficulties that may be encountered with a particular asset (compatibility, feature configuration, and so on). Community forums include posts relating to one or more hardware product types or software types/releases. Content management systems provide support and training content relating to one or more assets.

These are just a few non-limiting examples of the content of the notifications 302a-g stored in the knowledge base 304.

The semantic analysis component 310 learns semantics 312 of the notifications 302a-g. The semantics 312 include keywords and metric values such as a severity score, urgency score, etc. The semantic analysis component 310 applies fine-tuned multi-tasking to the notifications 302a-g to improve accuracy of the semantics 312 and to save time and resources for training. The semantics 312 are stored in a meta-semantic database 314.

In one or more example embodiments, the meta-semantic database 314 is prepared as a data source for generating the multi-level hierarchical summary 340. The meta-semantic database 314 stores semantic information (semantics 312) and summaries of unstructured data sources (e.g., defect description, coverage file, configuration instructions) after pre-processing.

For example, the semantic analysis component 310 captures semantic information on network-related unstructured data and combines contrastive and prompt learning for generating a summary of a respective notification (e.g., a single document). The semantic analysis component 310 performs linguistic evaluations using multi-task learning approaches to simultaneously extract multiple semantic features (e.g., metric values and keywords) from unstructured documents and thus, obtains high accuracy in the generated semantic summary while saving training time, memory, and/or computational resources.

The risk prioritization component 320 and the summarization engine 330 use inventory data 322 and the meta-semantic database 314 to generate a fluent and salient-catching summary i.e., the multi-level hierarchical summary 340 that includes a summary report 342 and actionable suggestions 344 specific to the enterprise network. The multi-level hierarchical summary 340 includes various granularities such as a single advisory level, a single device level, variously grouped device levels, and/or a network domain level.

Specifically, based on the semantic analysis of the semantic analysis component 310, the risk prioritization component 320 prioritizes the most critical network issues of a given device or a group of devices (e.g., product family summary report, asset group summary report, enterprise level summary report) after considering the inventory data 322 (e.g., the status 324 (current state), basic information 326, and defects 328 i.e., semantic meaning of defects 328. Based on identifying the most critical issues that need attention for the current network device(s), the summarization engine 330 generates a multi-level hierarchical summary 340 based not only on the list of defects but also on the current conditions of the network device(s) obtained from the inventory data 322.

In one or more example embodiments, the multi-level hierarchical summary 340 and/or any subsequent changes in the configuration of the one or more affected network devices are fed back, shown at 350, into the semantic analysis component 310 to further improve the meta-semantic database 314 generated by the semantic analysis component.

Figure 4:
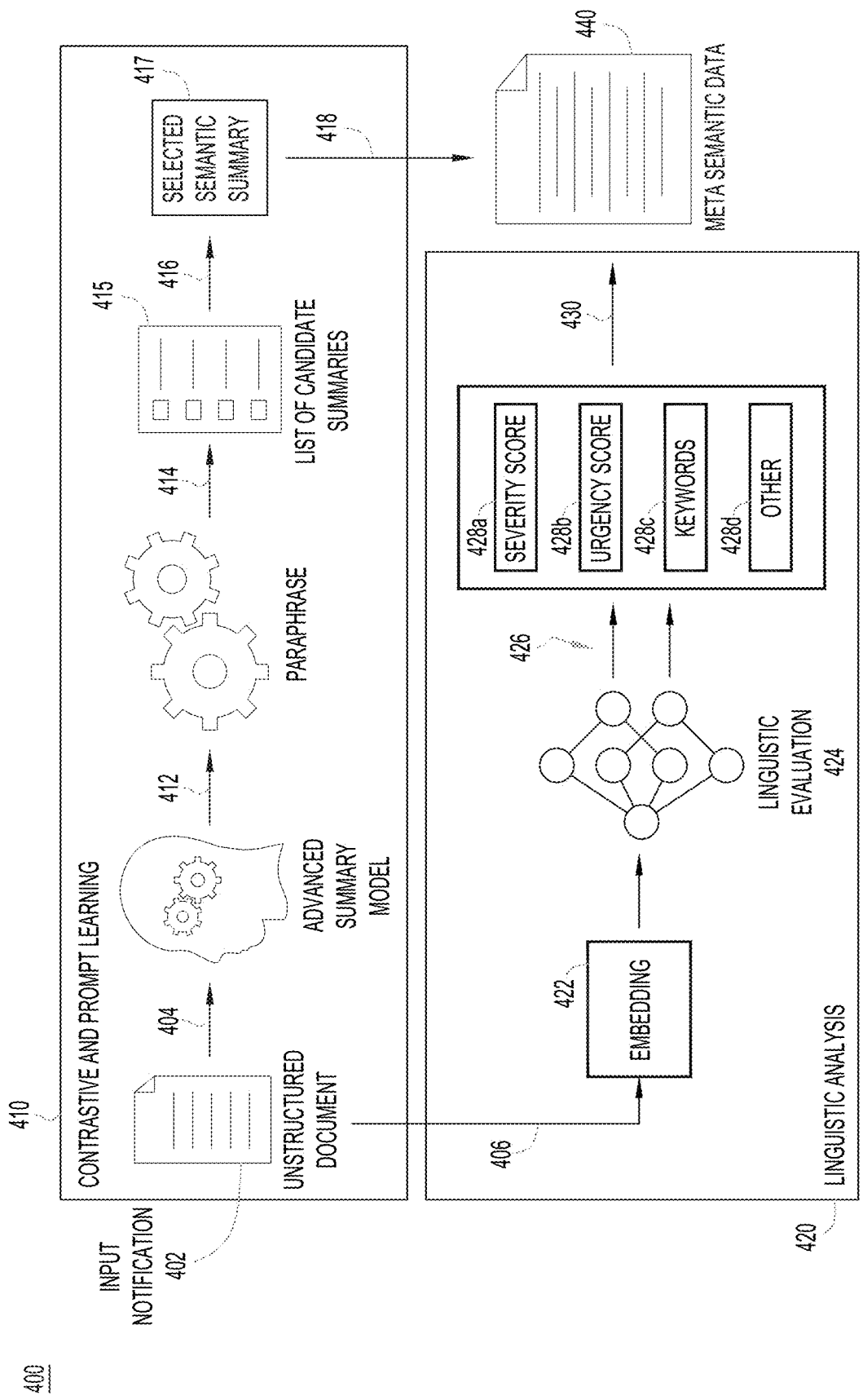
FIG. 4 is a flow diagram illustrating a semantic analysis method 400 for generating semantics of notifications, according to an example embodiment.
Figure 6:
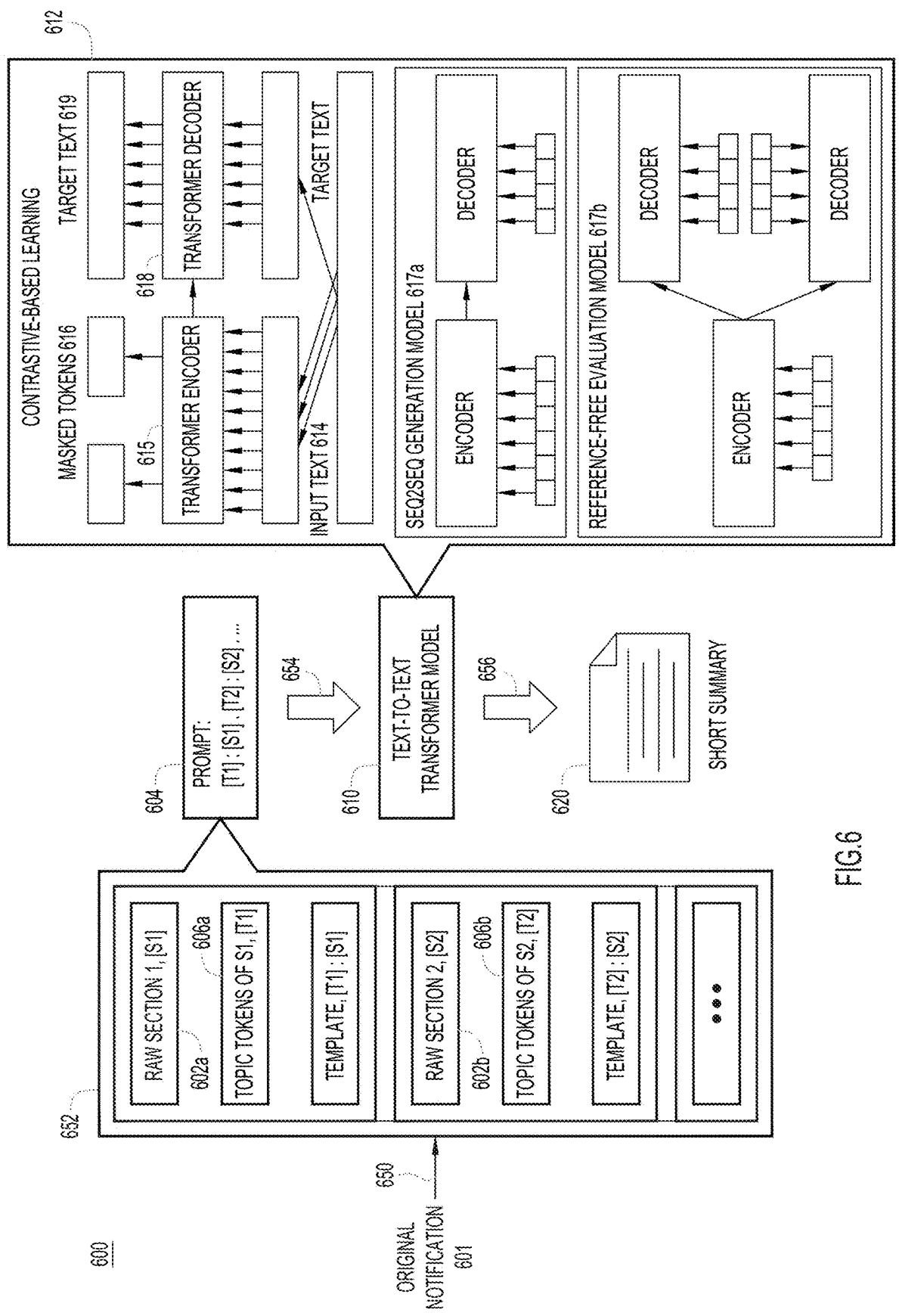
FIG. 6 is a diagram illustrating a prompt learning method that generates a short summary of a notification, according to an example embodiment.

With continued reference to FIG. 3, FIG. 4 is a flow diagram illustrating a semantic analysis method 400 for generating semantics of notifications, according to an example embodiment. The semantic analysis method 400 is performed by the semantic analysis component 310 of FIG. 3 and involves analyzing an input notification 402 using contrastive and prompt learning 410 and linguistic evaluation 420 to generate meta semantic data 440 such as the semantics 312 of FIG. 3.

Specifically, the semantic analysis method 400 starts with the semantic analysis component 310 obtaining the input notification 402. The input notification 402 may be an unstructured data document (e.g., advisory, notice, alert, informational post, bug report, etc.) that includes data or content related to the network. The input notification 402 is provided at 404, for contrastive and prompt learning 410 and at 406, for the linguistic evaluation 420, to generate meta-semantic information from different aspects of the document. The semantic analysis component 310 may perform the contrastive and prompt learning 410 and the linguistic evaluation 420 in parallel to decrease computational time.

The contrastive and prompt learning 410 includes analyzing the input notification 402 as follows. At 412, an advanced summarization model (machine learning (ML)) is applied to the input notification 402 to paraphrase content in the input notification 402 using prompt learning techniques. That is, prompt learning of the respective notification is performed in which at least one trigger token is selected from a section within the respective notification and at least a portion of a text in the section is concatenated based on the at least one trigger token. Thus, at 414, the paraphrased content is used to generate a list of candidate summaries 415.

At 416, the paraphrased short summaries are compared to the original document (the input notification 402) and to each other, using contrastive learning, to select the best-match (selected semantic summary 417) that is tied to the original document. The contrastive learning of the plurality of short summaries involves determining one or more features of a respective short summary from the plurality of short summaries and one or more relationships to other short summaries of the plurality of short summaries. At 418, the selected semantic summary 417 is used to generate the meta semantic data 440.

The linguistic evaluation 420 uses a multi-task learning e.g., (ML). Specifically, at 422, the input notification 402 is embedded or encoded to generate a plurality of vectors. At 424, the embedded notification is linguistically processed by multiple prediction heads. Each prediction head includes a neural network tuned to produce a specific key value (metrics and/or keywords). The metric values may be defined by a user. At 426, a set of useful metrics is generated such as a severity score 428a, an urgency score 428b, keywords 428c, and other useful information 428d. At 430, the metrics values are used to generate the meta semantic data 440. With the linguistic evaluation 420, higher accuracy is obtained. Additionally, less time and resources are required for generating solutions from the input notification 402.

The semantic analysis method 400 learns and comprehends various critical information of an original notification. For example, selected semantic summaries describe the general idea of the original notification. Severity and urgency scores describe the defects and affected products (network devices). The meta semantic data 440 is then used as input source data for generating a summary report such as the multi-level hierarchical summary 240 of FIG. 2.

With continued reference to FIGS. 3 and 4, FIG. 5 is a view illustrating semantic data 500 having network domain specific data labels for semantic learning, according to an example embodiment. The semantic data 500 illustrates an original notification 502 which is semantically processed using network domain specific data labels 512a-e to generate domain labeled data 510. The domain labeled data 510 is based on network specific semantic analysis with respect to unstructured data of the original notification 502.

Since various transformer models achieved success in natural language processing, it is a predominant approach in which pre-trained transformer models are used. Using network domain specific data labels 512*a-e* to generate domain labeled data 510 avoids expensive training process and time-consuming data preparation. Further, the network domain specific data labels 512*a-e* are designed specific for network related issues.

In one example embodiment, the original notification 502 such as a field notice, security advisory, etc. includes unstructured data such as details of the network devices that may be affected, vulnerabilities involved, impact on these network devices, etc. The unstructured data may include bulletin summary and metric values such as scores (severity, urgency, criticality, category, type, etc.).

The contrastive and prompt learning 410 of FIG. 4 uses network domain specific labels 512*a-e* to obtain network specific semantic meaning from the unstructured data. For example, contrastive learning and prompt learning are deployed to obtain an expert summary 512*a*, solutions 512*b* (mitigating actions), a severity score 512*c*, an urgency score 512*d*, and keywords 512*e*. These are just some non-limiting examples of domain labeled data 510. Moreover, only some of these network domain specific data labels 512*a-e* may be determined from the original notification 502. That is, based on a notification type, the semantic analysis may use different ones of the network domain specific data labels 512*a-e*.

With continued reference to FIGS. 3-5, FIG. 6 is a diagram illustrating a prompt learning method 600 that generates a short summary of a notification, according to an example embodiment. The prompt learning method 600 is performed by the semantic analysis component 310 of FIG. 3 and involves the contrastive and prompt learning 410 of FIG. 4. The prompt learning method 600 generates a short summary 620 such as semantics 312 of FIG. 3 or a short summary for the meta semantic data 440 of FIG. 4.

The prompt learning method 600 involves obtaining raw text of the original notification 601 (e.g., a document) and at 650, dividing the raw text into multiple sections such as a first section 602*a* (raw section 1) and a second section 602*b* (raw section 2). That is, instead of inputting tokenized sectioned raw text, the prompt-based learning is used to obtain an improved summarization (semantics). In addition to dividing the raw text, multiple tokens are generated, each specific to a particular section. Further, templates that include a portion of text from a section and tokens are generated. Specifically, at least one trigger token is selected from a section within the respective notification and at least a portion of a text in the section is concatenated based on the at least one trigger token.

Specifically, at 652, a prompt 604 is generated by selecting various templates. The prompt 604 is a portion of text from one or more sections of the original notification 601 and one or more trigger tokens. A trigger token is one of topic tokens (such as a first topic token 606*a* (T1) of the first section 602*a* and/or a second topic token 606*b* (T2) of the second section 602*b*). The trigger tokens are selected from the vocabulary that is most relevant (most related) to a respective section. In one example, the prompt 604 includes pairs of raw section texts and trigger tokens (T1, S1, T2, S2) and are concatenated into the input of a text-to-text transformer model 610 for summarization. At 654, the prompt 604 (concatenated text and tokens) is input into the text-to-text transformer model 610 for contrastive learning.

The nature of human language is that it is difficult to determine whether an expression is entirely correct. Using contrastive-based learning 612 of the text-to-text transformer model 610, at 656, a short summary 620 is generated that is semantically accurate. That is, one or more relationships between these short summaries is analyzed to select the short summary 620 that most accurately describes the original notification 601.

Contrastive-based learning 612 is a machine learning technique that learns the general features of a dataset without labels. One or more tokens in the prompt 604 are masked from the section text in the prompt 604 (input text 614) and are then encoded (using a transformer encoder 615) to predict the masked tokens 616. Thus, the semantic meaning of the input text 614 is learned based on relationships between various text parts (e.g. using sequence to sequence (Seq2seq generation model 617*a* and reference free evaluation model 617*b*)). Further, the semantics obtained based on encoding the section text using trigger tokens are then input into a decoder (e.g., a transformer decoder 618) to generate the target text 619 (short summary). The decoder may generate various short summaries, based on analyzing the relationships of various sections to the original notification 601 and each other. Then, the best match (the short summary 620) is selected.

In addition to considering the accuracy of the generated candidate short summaries, the relationship between various generated candidate short summaries is analyzed (e.g., Bringing Order to Abstractive Summarization (BRIO)). Using prompt-based learning and contrastive learning and training the original notification 601 using domain labeled data of FIG. 5, the short summary 620 is generated. The short summary 620 is then used to generate the multi-level hierarchical summary 340 of FIG. 3.

With continued reference to FIGS. 3-6, FIG. 7A is a view illustrating a security notice summary 700, according to an example embodiment. The security notice summary 700 is an example of the short summary 620 of FIG. 6 generated by the semantic analysis component 310.

Specifically, the security notice summary 700 includes a symptom 702 and a reason 704. The symptom 702 is a description of the network problem (loss of service, remote exploit, etc.). The reason 704 is a description of why the symptom 702 exists and/or when it occurs. The security notice summary 700 may further be fine-tuned using network domain specific data labels 512*a-e* of FIG. 5.

Figure 7A:
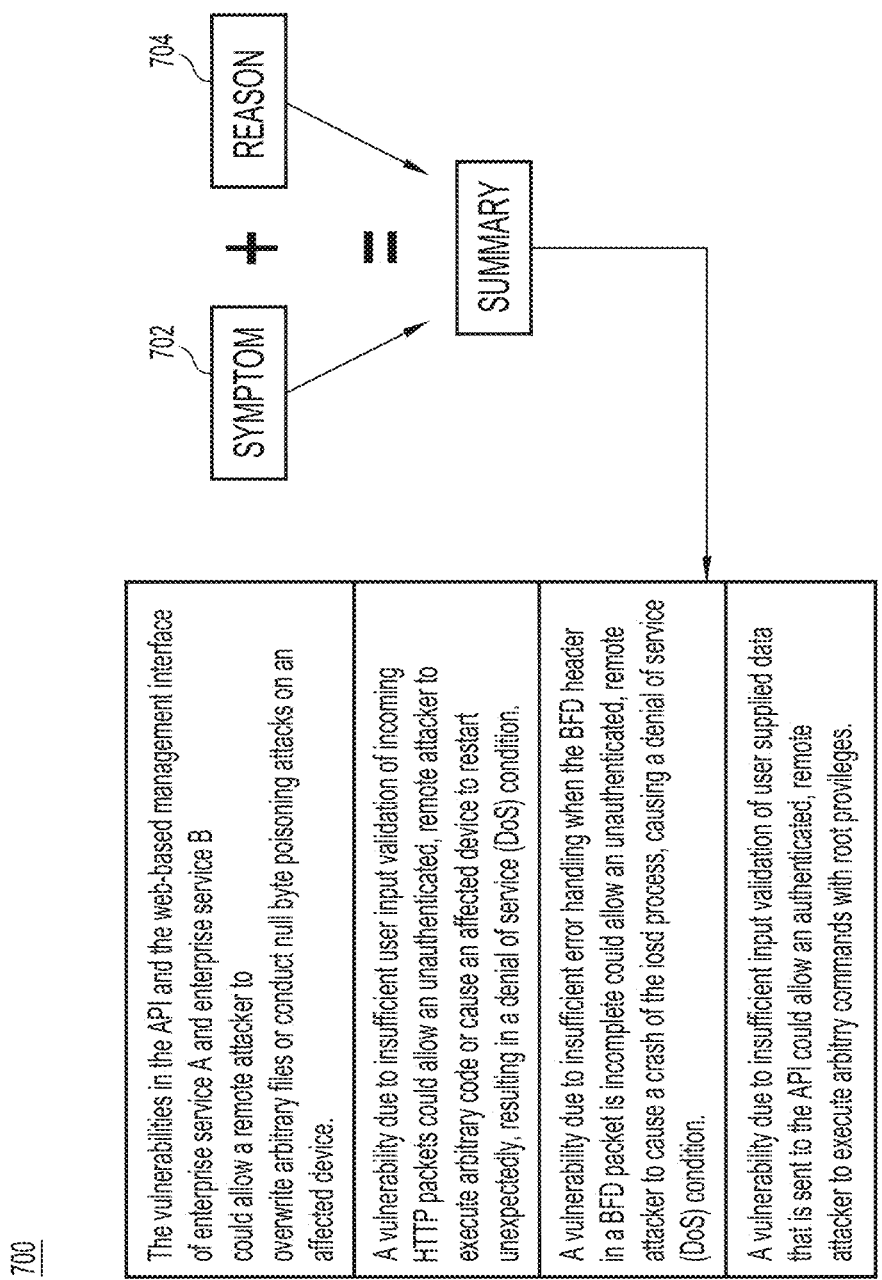
FIG. 7A is a view illustrating a security notice summary, according to an example embodiment.
Figure 7B:
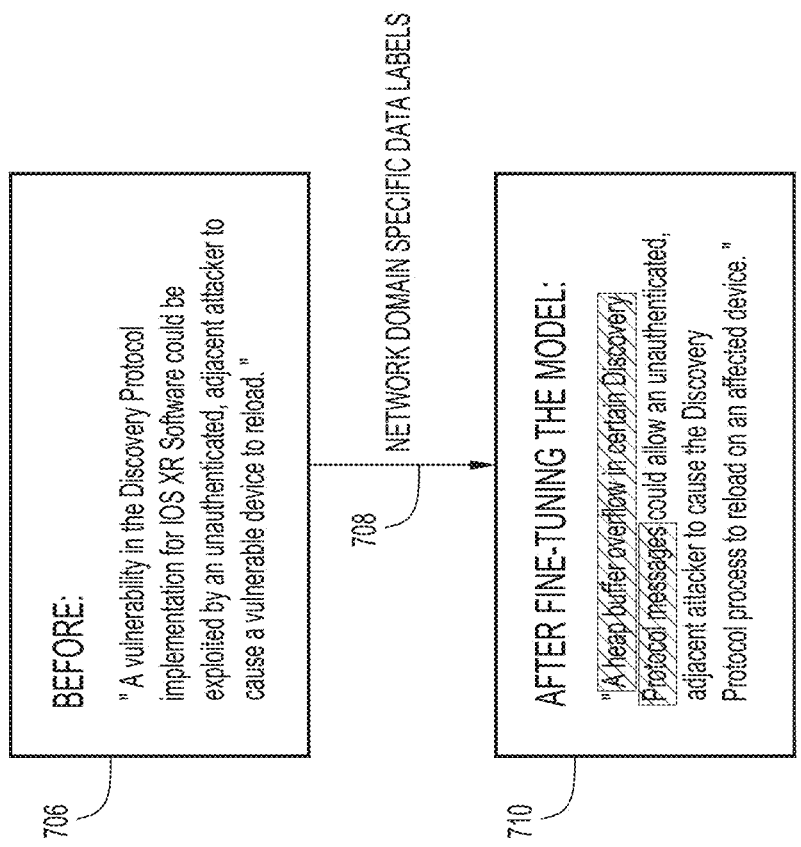
FIG. 7B is a diagram illustrating a portion of a summary generated using network domain specific data labels, according to an example embodiment.

FIG. 7B is a diagram illustrating a portion 710 of a summary generated using network domain specific data labels, according to an example embodiment. The portion 710 is an example of text in the short summary 620 of FIG. 6 generated by the semantic analysis component 310. A pre-trained portion 706 is generated based on an original notification. By using network domain specific data labels 708, the pre-trained portion 706 is fine-tuned or trained to include "buffer overflow". That is, by applying network domain specific data labels 708 such as the network domain specific data labels 512*a-e* of FIG. 5, a more accurate description of the issues is generated, as shown in the portion 710.

As another example, a short summary of a security advisory solution may include a wide range of issues such as detailed reasons, affected products, workarounds, and fixed software. As such, if the semantic analysis component 310 of FIG. 3 determines that the notification is a security advisory solution, the short summary is then generated to include details of the security vulnerability, fixed software and workarounds, and affected devices.

Figure 8A:
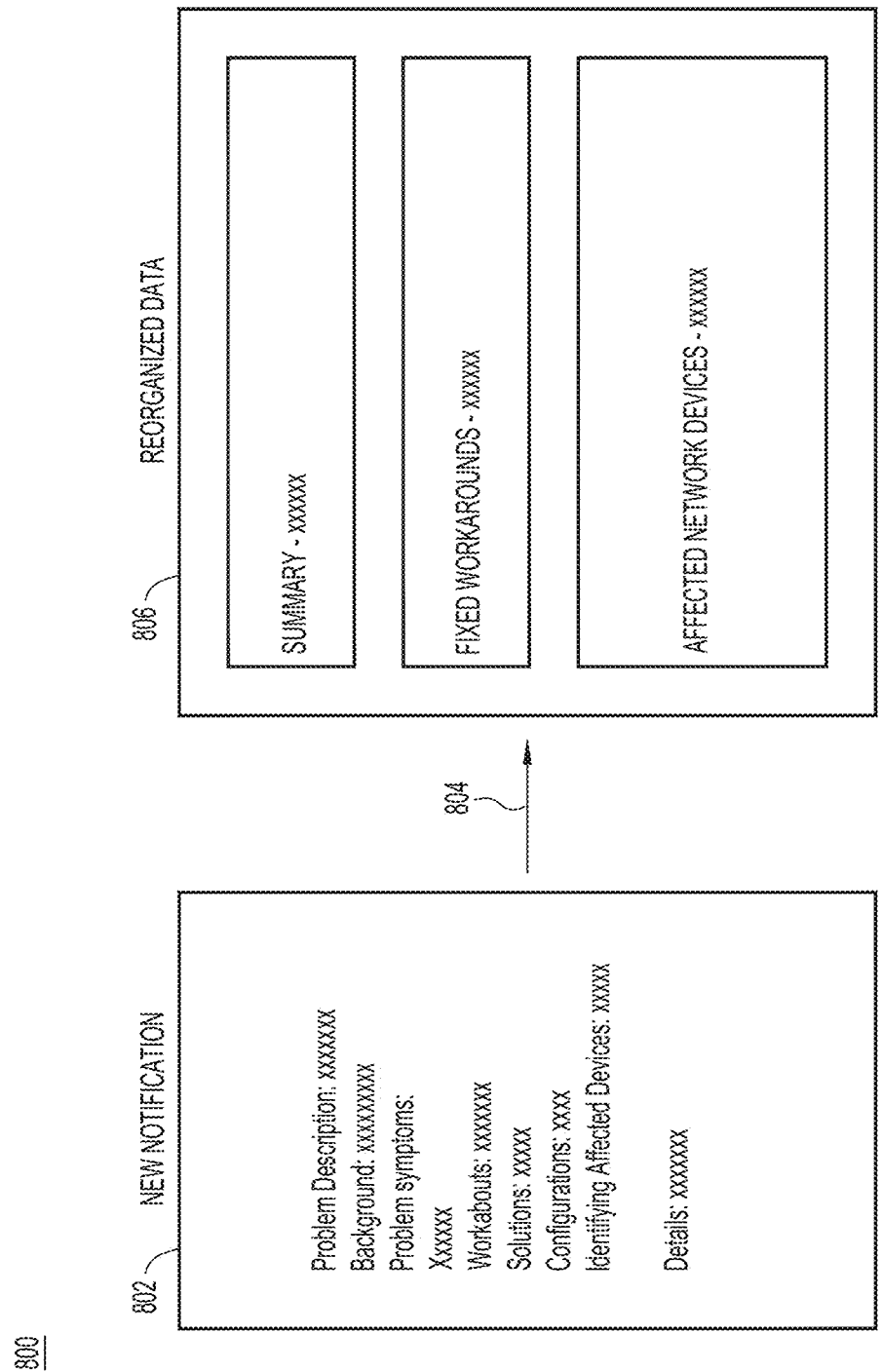
FIG. 8A is a diagram illustrating a method of reorganizing unstructured data in a new type of notification, according to an example embodiment.
Figure 8B:
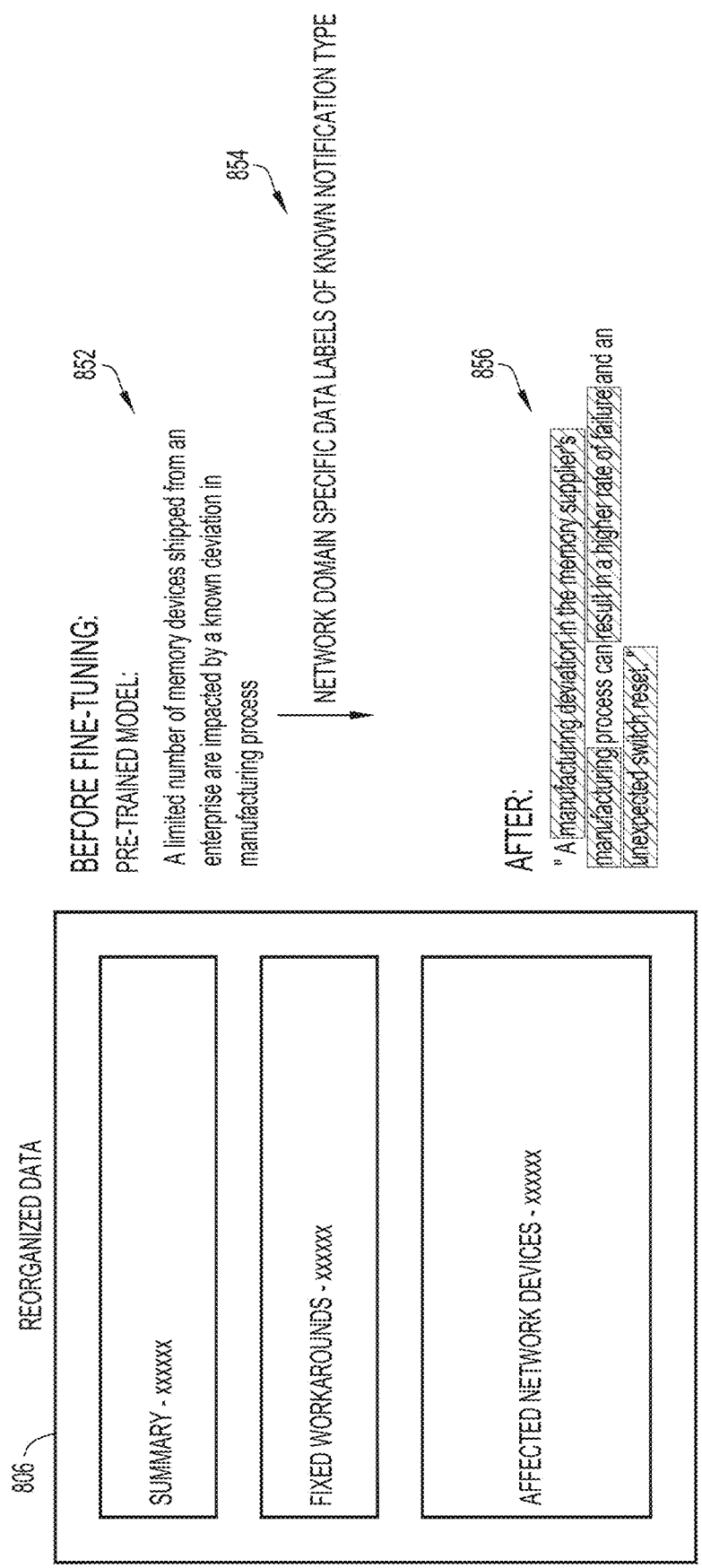
FIG. 8B is a diagram illustrating a portion of a short summary generated using the reorganized data of FIG. 8A and network domain specific data labels, according to an example embodiment.
Figure 9:
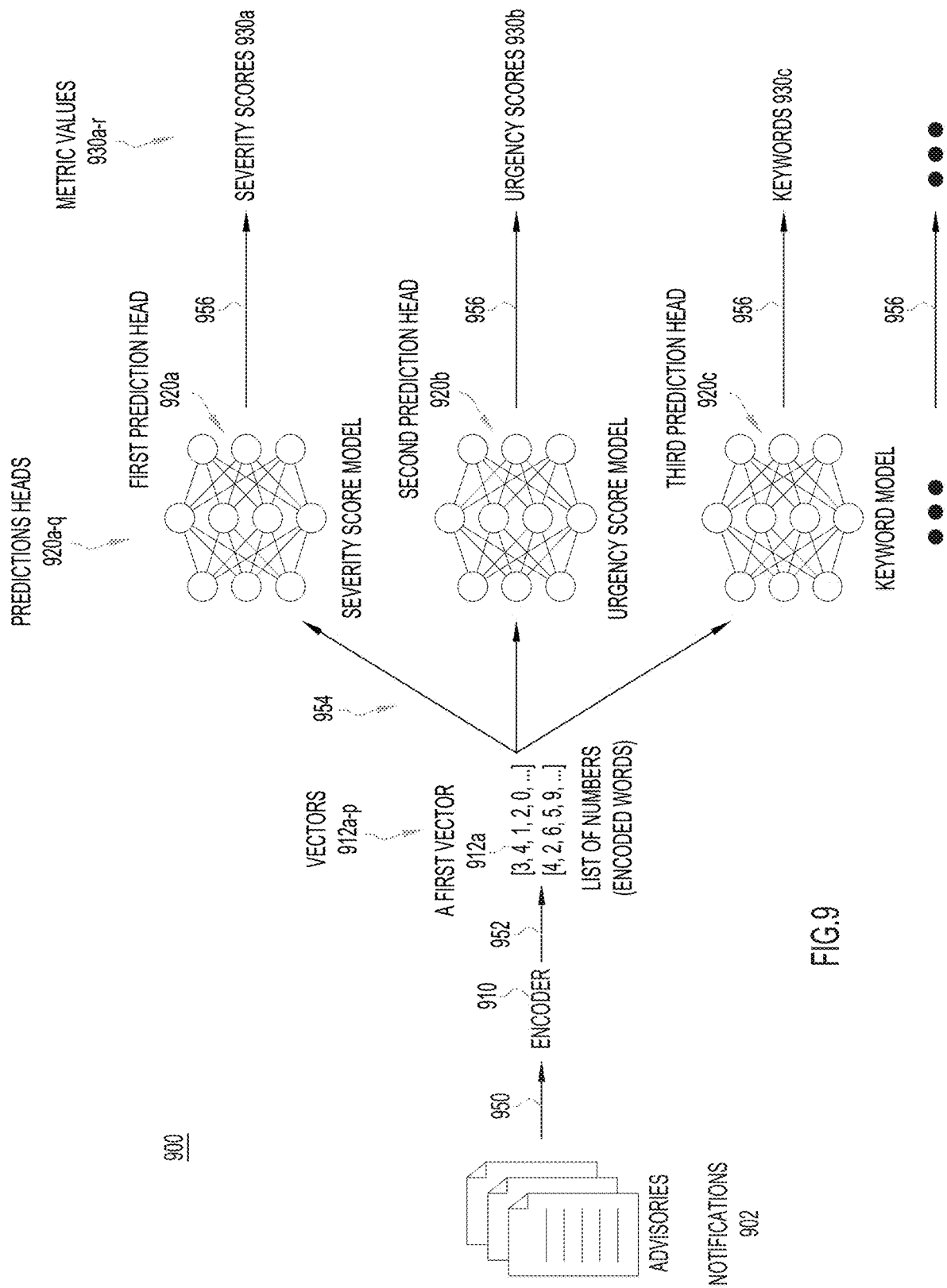
FIG. 9 is a flow diagram illustrating a linguistic analysis method that generates metrics values for a short summary of a notification, according to an example embodiment.

FIGS. 8A and 8B are diagrams illustrating a short semantic summary being generated for a new type of notification, according to an example embodiment. The short semantic summary is an example of the short summary 620 of FIG. 6 generated by the semantic analysis component 310.

Specifically, FIG. 8A is a diagram illustrating a method 800 of reorganizing unstructured data in a new type of notification, according to an example embodiment. The method 800 is performed by the semantic analysis component 310.

The method 800 involves obtaining a new notification 802. That is, the semantic analysis component 310 determines that this is a new notification type different from the notification types stored in the meta-semantic database 314. The new notification 802 is unknown for generating trigger tokens. For example, the new notification 802 may be a field notice or a vulnerabilities report, previously not processed by the network hierarchical summary and recommendation service 120 of FIG. 1.

At 804, unstructured data in the new notification 802 is processed or reorganized into a predetermined format of one of the known notification types stored in the meta-semantic database 314. That is, the semantic analysis component 310 generalizes the network domain specific data labels to apply to other types of notifications that may be new and unknown. The raw unstructured data in the new notification 802 is analyzed and reorganized into a particular or a predetermined format e.g., of a known notification type such as a security advisory type. Thus, the method 800 generates the reorganized data 806. The reorganized data 806 includes summary (brief details) of the network problem, fixed workarounds, and affected network devices. The reorganized data 806 is in a predetermined format to resemble one or more of known notification types.

In one example, the reorganized data 806 resembles the predetermined format of a security advisory solution described above. The semantic analysis component 310 then generates tricky trigger tokens such as the token "affected products" for the field notice background section. This is because the field notice background section contains detailed reasons and affected network devices information, which is very similar to the "affected products" section included in the security advisory.

FIG. 8B is a diagram illustrating a portion 856 of a short summary generated using the reorganized data 806 of FIG. 8A and network domain specific data labels, according to an example embodiment. The reorganized data 806 is used to generate the short summary by applying network domain specific data labels of a known notification type that was used to restructure the data in FIG. 8A. The portion 856 is an example of text in the short summary 620 of FIG. 6 for a new notification type, which is generated by the semantic analysis component 310. The pre-trained portion 852 is generated using the reorganized data 806. By applying network domain specific data labels 854 of a known notification type(s) to the pre-trained portion 852, a portion 856 of the short summary is generated. The portion 856 provides a more accurate description than the pre-trained portion 852.

A summary can also be generated when a new type or an unknown type of notification is encountered by the network hierarchical summary and recommendation service 120. In one or more example embodiments, the semantic analysis component 310 reorganizes unstructured data in a new or an unknown type of notification into a predetermined structured data format. The format is of a known type of notifications. The semantic analysis component 310 selects one or more known notification types by processing content of the new notification type. The semantic analysis component 310 then restructures the content of a new notification type to be similar to the structure of the known notification types. The network domain specific data labels 854 of the selected and known notification types are then applied to the reorganized content of the new notification type.

The above is just one non-limiting example of the new notification. Types of notifications may include alert reports, field reports, vulnerability notices, expert reports, bug reports, etc. The network hierarchical summary and recommendation service 120 when encountered with an unknown type of notification, restructures the data therein based on one or more known types of notification, and then applies trigger tokens (network domain specific data labels of these known notification types) to generate a short summary.

With continued reference to FIGS. 2-4, FIG. 9 is a flow diagram illustrating a linguistic analysis method 900 that generates metric values for a short summary of a notification, according to an example embodiment. The linguistic analysis method 900 is performed by the semantic analysis component 310. The linguistic analysis method 900 involves an encoder 910 that generates vectors 912*a-p* that are linguistically processed by prediction heads 920*a-q* (neural networks) to generate metric values 930*a-r*.

The linguistic analysis method 900 generates multiple outputs from one input, which is similar to multi-task learning. Unlike the multi-task learning, however, which may solve classification and sequencing tagging problems, the linguistic analysis method 900 outputs a variety of information that the user may need in the multi-level hierarchical summary 240 of FIG. 2. For example, the information includes metric values 930*a-r* such as a severity score, an urgency score, and one or more keywords.

The linguistic analysis method 900 involves obtaining notifications 902 from the knowledge base 304. Each notification is processed separately. The notification is labeled with one or more tags to identify the prediction heads 920*a-q* to use to generate the information.

Specifically, at 950, the tagged data of the notification is provided to the encoder 910. The encoder 910 may be a bidirectional encoder representations from transformers (BERT) encoder. At 952, the encoder 910 generates vectors 912*a-p* based on the tags such that there is one vector for each prediction head that was tagged.

At 954, the vectors are provided into the prediction heads 920*a-q*. For example, a first vector 912*a* generated from the tagged data is provided to a first prediction head 920*a* to generate a severity score 930*a*, a second prediction head 920*b* to generate an urgency score 930*b*, and a third prediction head 920*c* to generate keywords 930*c*. Each of the prediction heads 920*a-q* has a neural network that obtains the encoded input and process the input to produce the desired output, which may include scores and/or keywords. The neural networks within the prediction heads 920*a-q* are tuned differently from each other to generate a corresponding output value with high accuracy.

At 956, these metric values 930*a-r* are output to generate the multi-level hierarchical summary 340 of FIG. 3. By having different prediction heads 920*a-q*, the metric values are obtained using one model instead of training different models for one task. The linguistic analysis method 900 saves time and resources. The backend multi-task learning is specifically designed and trained in the network domain. Therefore, the neural networks are tuned differently to be conscious of buzzwords from the network domain that need attention when dealing with potential issues.

Figure 10:
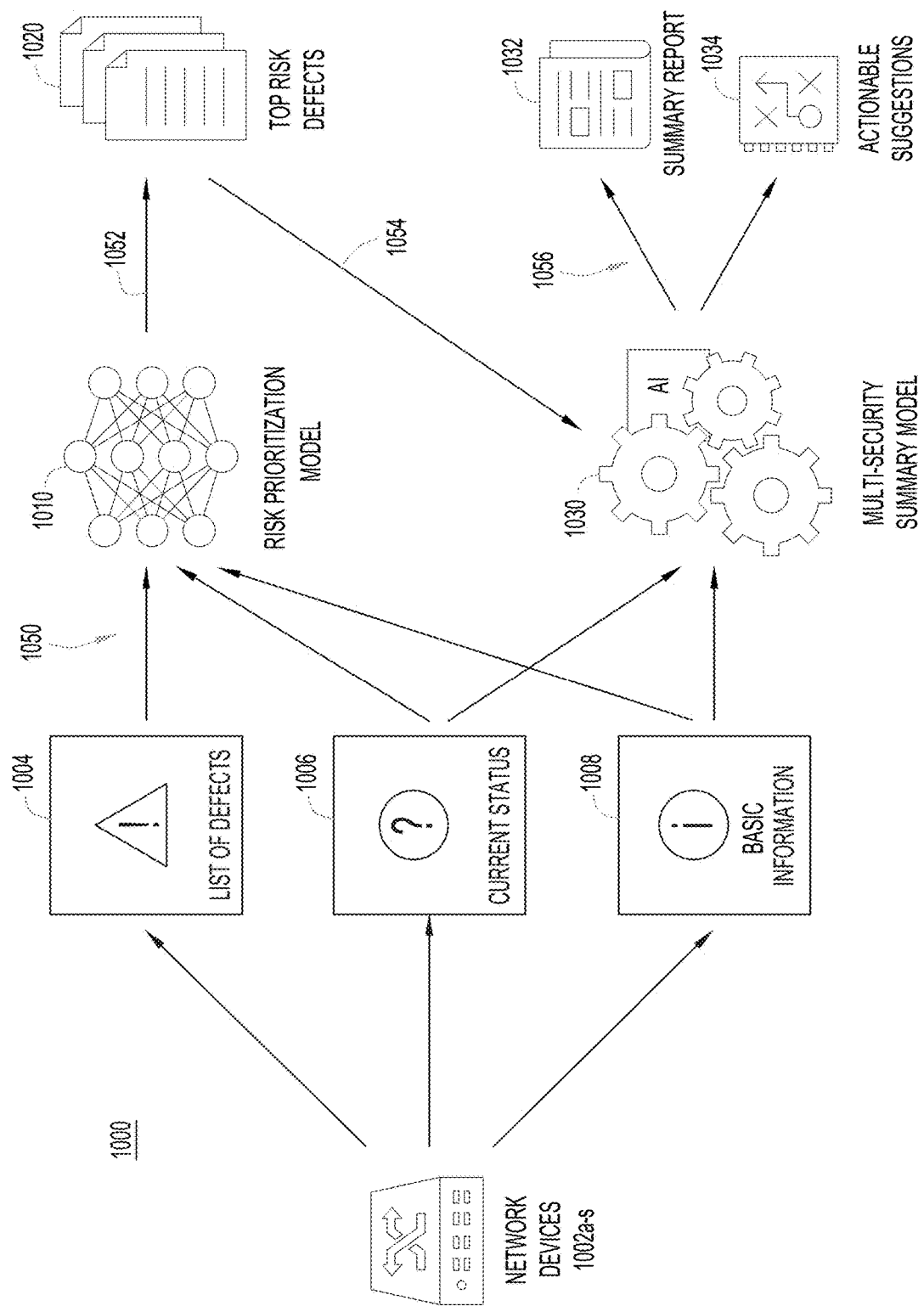
FIG. 10 is a flow diagram illustrating a hierarchical summary generation method in which certain actions or recommendations in the short summaries are prioritized based on determined risks and levels for a multi-level hierarchical summary are generated, according to an example embodiment.

With continued reference to FIGS. 2 and 3, FIG. 10 is a flow diagram illustrating a hierarchical summary generation method 1000 in which certain actions or recommendations in the short summaries are prioritized based on determined risks and levels for a multi-level hierarchical summary are generated, according to an example embodiment. The hierarchical summary generation method 1000 is performed by risk prioritization component 320 and the summarization engine 330 of FIG. 3. The hierarchical summary generation method 1000 involves obtaining inventory data that includes a list of defects 1004 (that may be detected by an enterprise network), a current status 1006, and basic information 1008 of network devices 1002a-s such as information about the configuration, settings, statuses or states, enabled/disabled features, etc. of the respective network device.

In one or more example embodiments, a single device or a group of devices (network devices 1002a-s) is associated with numerous unstructured and structured information that is mainly text-based, and device-specific meta-data used to define and differentiate the network devices 1002a-s from other assets (e.g., product type, functional role, enterprise role and importance). The knowledge of unstructured information and the statically and dynamically configured features and statuses of the network devices 1002a-s are used to prioritize detected network issues, mitigating actions to perform, and risks. That is, a set of network issues and suggested recommendation and/or actions are prioritized based on semantic meanings, detected statuses of one or more affected network devices, and at least one metric value.

Specifically, the hierarchical summary generation method 1000 involves at 1050, obtaining the information about the network devices 1002a-s such as their current statuses, detected defects, etc.

At 1052, using a set of rules 1010, short summaries generated by the semantic analysis component 310 of FIG. 3 are ranked or ordered based on their priority or importance with respect to the network devices 1002a-s. The set of rules 1010 may be default rules set by the network hierarchical summary and recommendation service 120 and/or may be defined by an enterprise network depending on its specific needs. For example, the set of rules 1010 may include:

Semantic information: authenticated vs. unauthenticated, remote vs. local,
Role: "core", "border router", "distribution", "access", "others",
Product Type: "switches", "routers", "wireless", "others", . . . .
Days to last updates: more recently published notifications are assigned a higher weight. If a notification was published or posted more than predetermined number of days (e.g., more than 30 days) but was not addressed by an enterprise, the risk prioritization component 320 assigns low weight to the summary because the enterprise may not care about it or is not interested in fixing the issue.
Scores: severity (1-10), urgency (1-10), etc. The scores are input into the weight being assigned to the notification.
Vulnerability or Potential Vulnerability: Yes or no. If it is a potential vulnerability, lower the assigned weight as opposed to actual vulnerability.
Quantity (number) of affected network devices: the more network devices being affected, the higher the weight. Upper and lower bounds may be defined or set by the user.

These are just some non-limiting examples of generating a weight for a respective notification (short summary) using the set of rules 1010. These weights are then used to rank or order the short summaries such that a first notification having a higher weight is prioritized over a second notification having a lower weight.

The weights provide for prioritizing the notifications based on their recency, severity, and/or impact. For example, a higher weight may be assigned to a notification recently published or one that is labeled as critical. The higher the severity and urgency scores of the notification, the more weight it is given. A higher weight is also assigned if the network devices 1002a-s are vulnerable and based on quantity of the network devices 1002a-s being affected. Moreover, the weight of the notification may vary based on the notification type. For example, a security alert notification type may be assigned a higher initial weight than an informational notice notification type.

The notifications are further weighted (prioritized) based on semantic knowledge of unstructured information related to a network device or a group of network devices. For example, in an advisory notification, different weights may be assigned based on whether an authenticated or non-authenticated attacker is involved and based on whether the attack was initiated remotely or locally. Further, the assigned weight may vary based on impact to the enterprise if a vulnerability causes a loss of service, slowdown, unpredictable behavior, and/or end of life.

By analyzing the notifications that apply to the network devices 1002a-s (using the set of rules 1010), at 1052, a prioritized list of the notifications 1020 that is ranked from the highest priority to the lowest is generated. Additionally, instructions for the next steps (actionable suggestions) are generated with the highest priority actions being provided first. Further, some of the network issues or defects may be emphasized for user awareness and to prevent the users from being overwhelmed with a plethora of information.

At 1054, the prioritized list of notifications 1020 (prioritized and ranked short summaries) with actionable tasks to mitigate the network issues (prioritized and ranked) is provided to a summarization engine 330 for machine learning 1030 to generate a multi-level network summary report 1032 and multi-level actionable suggestions 1034 (tasks).

At 1056, the summarization engine 330 applies the machine learning 1030 and generates the multi-level network summary report 1032 and the multi-level actionable suggestions 1034. An aggregated summary (multi-level network summary report 1032 and multi-level actionable suggestions 1034) is based on the results from the risk prioritization process. The summarization engine 330 also considers the enterprise network, device-related statuses and the defects information that the enterprise needs to prioritize after screening the prioritized list of notifications 1020. The summarization engine 330, by applying machine learning 1030, generates hierarchical information that includes multiple levels for the aggregated summary.

For example, a first level of the summary is specific to one or more affected network devices from the plurality of network devices, a second level is specific to a group of network devices, a third level specific to a network domain of the network, and a fourth level is specific to multiple network domains that provide a particular network enterprise service (e.g., all network sites of the enterprise that provide a private Wi-Fi network).

The multi-level actionable suggestions 1034 includes a plurality of tasks that are prioritized with various actions to mitigate the respective issues. Actions may include automated changes of configurations of one or more affected network devices by performing the at least one actionable task in the summary report.

FIG. 11 is a view illustrating two levels of a multi-level hierarchical summary 1100, according to an example embodiment. The multi-level hierarchical summary 1100 includes a group level summary 1110 and a single device summary 1120.

Each of the group level summary 1110 and the single device summary 1120 includes basic information 1102, impact 1104 and description of issues 1106. The basic information 1102 may include potential risk (low, medium, or high). Basic information 1102 may further identify number of notifications and notification types that are determined to apply to network device(s).

The impact 1104 identifies potential impact of these notifications on the enterprise network such as may cause network slowdowns, unauthorized access, etc. The issues 1106 is a summary of potential issues that users can face if the notification are not addressed, which is generated based on the risk prioritization. In one example, issues are combined if they have similar impacts, symptoms, and/or reasons. The issues 1106 may include a few examples of possible consequences to the enterprise network if the notification is not addressed.

The group level summary 1110 may further include actionable tasks to mitigate these issues. The actionable tasks may be performed based on user's confirmation or automatically. When the mitigating actions are automatically performed by the network hierarchical summary and recommendation service 120, the multi-level hierarchical summary 1100 may include a notification that these mitigating actions were performed.

For example, a network engineer of a large enterprise network with at least 10,000 assets receives many notifications (notices and advisories) that may potentially apply to their network devices. The network hierarchical summary and recommendation service 120 handles these notifications for the network engineer by generating a multi-level hierarchical summary. The network hierarchical summary and recommendation service 120 provides the critical issues first to avoid any potential risks within the enterprise network. For example, the network hierarchical summary and recommendation service 120 may perform a configuration change to affected network devices to prevent cyber-attacks on the enterprise network can be detrimental to the enterprise by increasing costs, operational disruptions, and reputational damage. The network hierarchical summary and recommendation service 120 helps the network engineer to address the advisories and notices by providing high-level summary information on the risk of the enterprise's device(s) as well as the next steps or actions from the notifications on how to lower the risk and mitigate the chance of an attack.

As another example, a network engineer is responsible for managing several enterprise sites of an enterprise network on daily basis. The network hierarchical summary and recommendation service 120 generates a summary report specific to the network domains of the network engineer i.e., specific to a location level. The summary report includes the risk, impact on an enterprise, and critical issues with actionable suggestions or tasks. At the same time, the network engineer views the corresponding summary report of different groups e.g., for a particular product family, for network devices responsible for a particular enterprise network service, etc. The network engineer may view a more detailed report that is specific to a single network device, and then that is specific to a particular notification. The summary report may be a document that includes symptoms, causes, and solutions for a vulnerability instead of reviewing, parsing, and trying to understand the full documentation related to the network device.

The network hierarchical summary and recommendation service 120 saves time for the enterprise network and users by providing real-time analysis of the issues or potential issues in the enterprise network. The network hierarchical summary and recommendation service 120 aids users in managing the enterprise network and network assets securely and safely.

The techniques presented generate a multi-level summary report with actionable tasks for network domains on various granularities such as a single notification, a single network device, group device levels, and/or network domain levels. The multi-level summary report summarizes and prioritizes required action items, thus increasing network optimization and security.

The techniques presented herein deploy semantic analysis to generate an individual summary with solutions for a notification, a summary of issues with solutions for a network device, group of network devices, network domain, etc. The semantic analysis involves dedicated contrastive learning and prompt learning to improve the summary generation and to generalize the scope to apply to new types of notifications i.e., to handle new types of documents. The semantic analysis involves linguistic analysis to extract key semantic information or features from the notification. The linguistic analysis learns various semantics of notification such as the severity and urgency scores and keywords simultaneously, with fine-tuned multi-tasking to gain higher accuracy and to save time and resources for training.

The techniques presented herein further prioritize or rank the summaries by using machine learning that applies a set of rules for prioritizing and involves considering statuses and documentation of the network devices. The most critical concerns and more severe threats to the enterprise network are prioritized based on existing issues, statuses, and basic information about the enterprise network and network assets.

The techniques presented herein integrate and concatenate information and status of a single device or a group of devices to generate a summary report and corresponding suggested solutions and actions. The techniques presented herein generate a fluent and salient-catching summary and actionable suggestions specific to the enterprise network on various granularities such as the network domain level, a group of devices level(s), a single network device level, and a single notification level. The multi-hierarchy summary for a single device and a group of devices is not only based on the list of defects but also based on current conditions and/or statuses of the network devices. The techniques presented herein fine-tune the process using network domain specific data labels.

Figure 12:
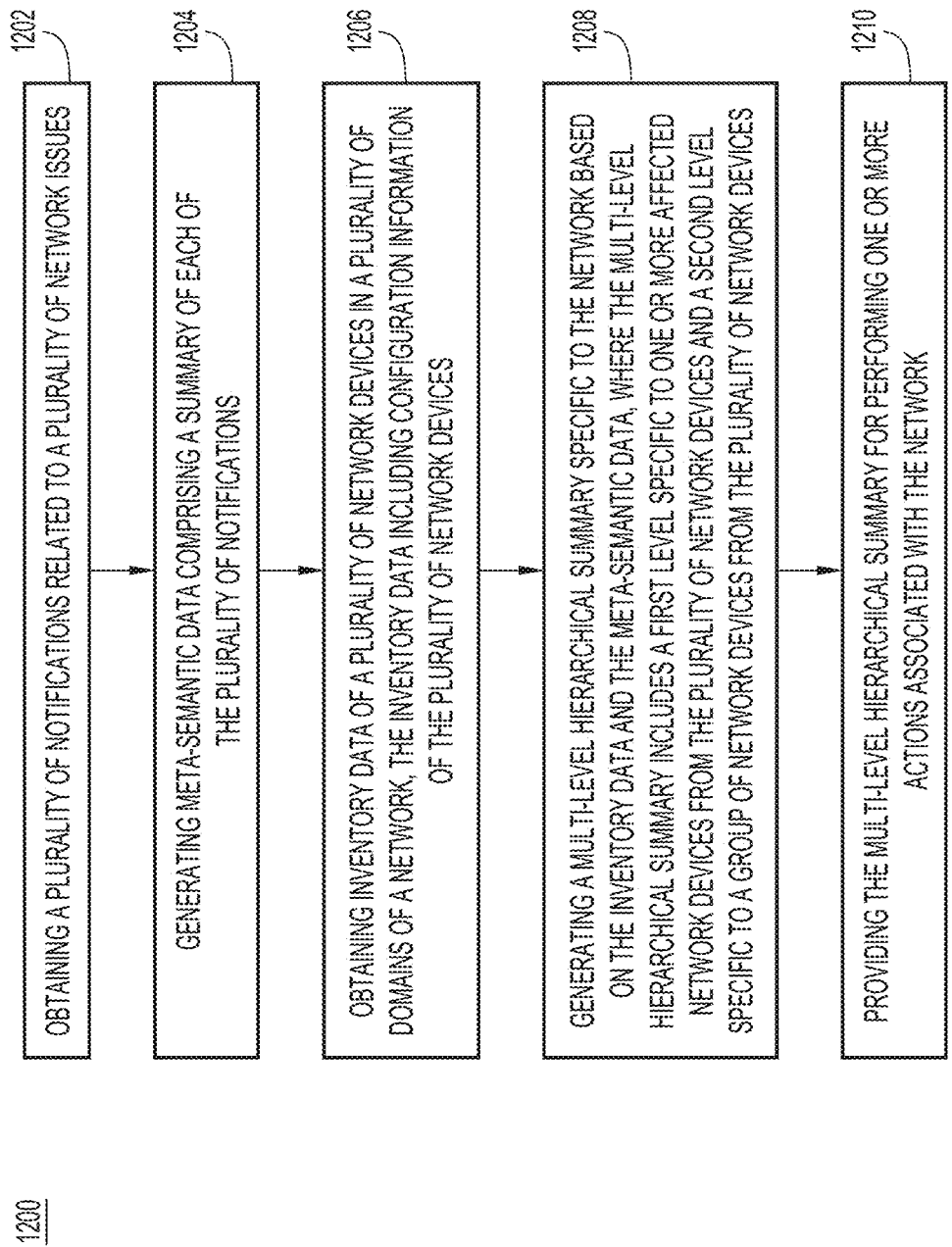
FIG. 12 is a flowchart illustrating a method of providing multi-level hierarchical summary for performing one or more actions associated with a network, according to an example embodiment.

FIG. 12 is a flowchart illustrating a method 1200 of providing multi-level hierarchical summary generated using meta-semantic data based on inventory data specific to a particular network, according to an example embodiment. The method 1200 may be performed by a computing device such as a server or a group of servers that execute the network hierarchical summary and recommendation service 120 of FIGS. 1-11.

The method 1200 involves, at 1202, obtaining a plurality of notifications related to a plurality of network issues and at 1204, generating meta-semantic data including a summary of each of the plurality of notifications.

The method 1200 further involves at 1206, obtaining inventory data of a plurality of network devices in a plurality of domains of a network. The inventory data includes configuration information of the plurality of network devices.

Additionally, the method 1200 involves at 1208, generating a multi-level hierarchical summary specific to the network based on the inventory data and the meta-semantic data. The multi-level hierarchical summary includes a first level specific to one or more affected network devices from the plurality of network devices and a second level specific to a group of network devices from the plurality of network devices.

Further, the method 1200, further involves at 1210, providing the multi-level hierarchical summary for performing one or more actions associated with the network.

According to one or more example embodiments, the first level may be a first summary report and the second level may be a second summary report. Each summary report includes at least one actionable task to mitigate a respective issue from the plurality of network issues identified in the respective summary report.

In one instance, the method 1200 may further involve changing, by a computing device, a configuration of at least one of the one or more affected network devices by performing the at least one actionable task in the first summary report or the second summary report.

In one form, the operation 1208 of generating the multi-level hierarchical summary specific to the network may include generating a third level specific to a network domain of the plurality of domains of the network. The third level may include a list of affected network devices of the network domain, a description and impact for each of one or more network issues in the network domain, and at least one actionable task to mitigate the one or more network issues in the network domain.

In another form, the operation 1204 of generating the meta-semantic data may include generating a plurality of short summaries for a respective notification of the plurality of notifications and selecting one short summary from the plurality of short summaries using contrastive learning. The operation 1204 of generating the meta-sematic data may further involve determining a plurality of metrics related to a respective network issue described in the respective notification and generating an individual summary for the respective notification. The individual summary may include the one short summary and the plurality of metrics related to the respective network issue.

According to one or more example embodiments, the operation of generating the plurality of short summaries may include performing prompt learning of the respective notification in which at least one trigger token is selected from a section within the respective notification and at least a portion of a text in the section is concatenated based on the at least one trigger token.

In one instance, the plurality of metrics may include an urgency score and a severity score of the respective network issue. The operation of selecting the one short summary may include performing the contrastive learning of the plurality of short summaries by determining one or more features of a respective short summary from the plurality of short summaries and one or more relationships to other short summaries of the plurality of short summaries.

In another instance, the method 1200 may further include reorganizing unstructured data in the respective notification into a predetermined format of a first notification type. The respective notification may be a new notification type different from the first notification type and is unknown for generating the at least one trigger token.

In yet another instance, the first level and the second level may each include a plurality of metric values including a severity score, an urgency score, and one or more keywords. Additionally, the operation 1204 of generating the meta-semantic data may include encoding data of a respective notification of the plurality of notifications to generate encoded data and linguistically processing the encoded data using a plurality of prediction heads. Each of the plurality of prediction heads may include a neural network tuned to generate a specific metric value of the plurality of metric values.

In one or more example embodiments, the first level and the second level may each include a set of network issues from the plurality of network issues. Each network issue in the set of network issues may include at least one metric value and at least one actionable task to mitigate a respective issue. The method 1200 may further include prioritizing the set of network issues based on semantic meanings, statuses of the one or more affected network devices, and the at least one metric value.

In one or more example embodiments, the set of network issues may include one or more of: at least one security related vulnerability detected in the network, at least one defect associated with the one or more affected network devices, and at least one network connectivity advisory.

Figure 13:
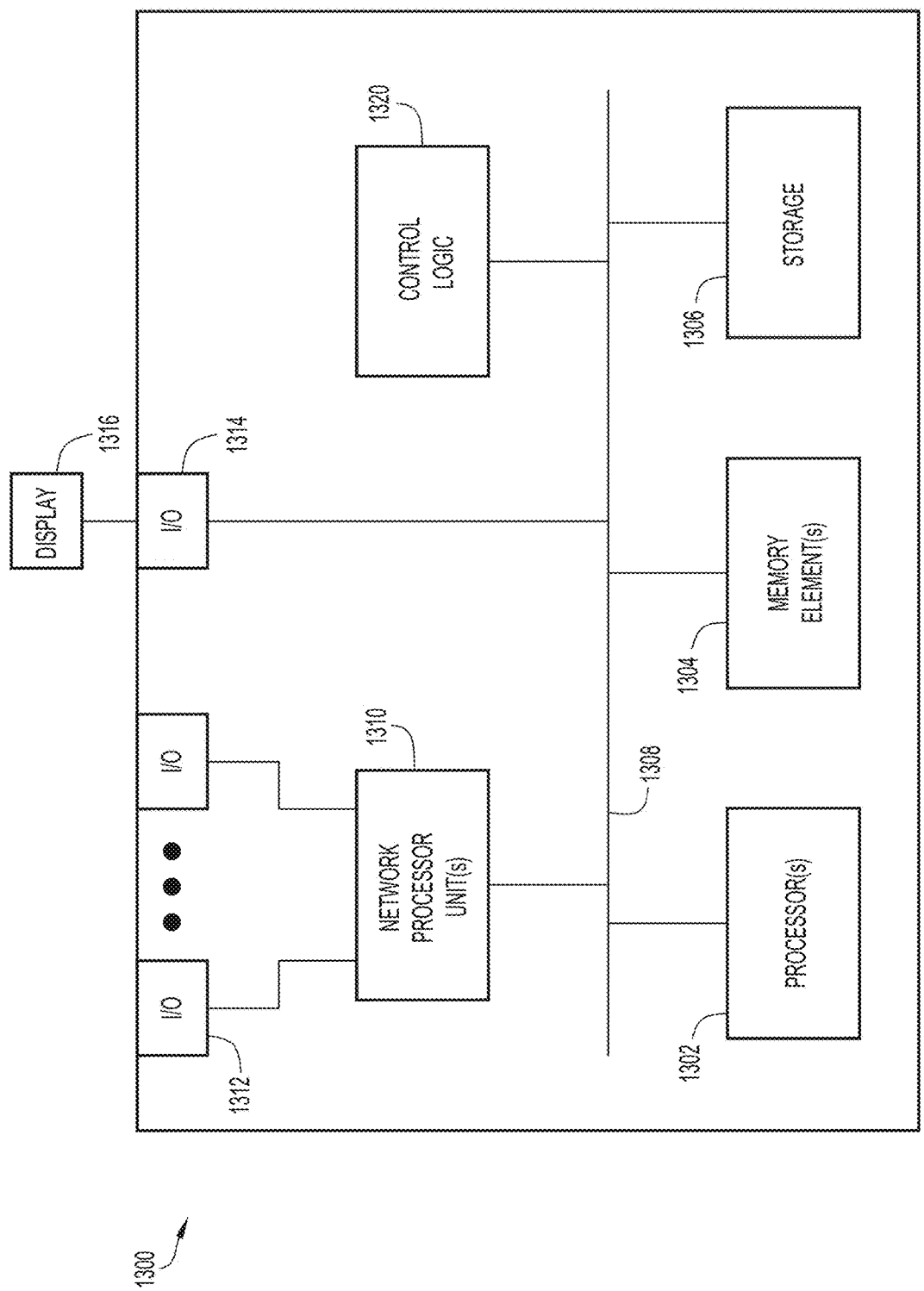
FIG. 13 is a hardware block diagram of a computing device that may perform functions associated with any combination of operations in connection with the techniques depicted and described in FIGS. 1-12, according to various example embodiments.

FIG. 13 is a hardware block diagram of a computing device 1300 that may perform functions associated with any combination of operations in connection with the techniques depicted in FIGS. 1-12, according to various example embodiments, including, but not limited to, operations of the computing device or one or more servers that execute the cloud portal 100 and/or the network hierarchical summary and recommendation service 120. Further, the computing device 1300 may be representative of one of the network devices, network/computing equipment, or hardware asset of an enterprise. It should be appreciated that FIG. 13 provides only an illustration of one example embodiment and does not imply any limitations with respect to the environments in which different example embodiments may be implemented. Many modifications to the depicted environment may be made.

In at least one embodiment, computing device 1300 may include one or more processor(s) 1302, one or more memory element(s) 1304, storage 1306, a bus 1308, one or more network processor unit(s) 1310 interconnected with one or more network input/output (I/O) interface(s) 1312, one or more I/O interface(s) 1314, and control logic 1320. In various embodiments, instructions associated with logic for computing device 1300 can overlap in any manner and are not limited to the specific allocation of instructions and/or operations described herein.

In at least one embodiment, processor(s) 1302 is/are at least one hardware processor configured to execute various tasks, operations and/or functions for computing device 1300 as described herein according to software and/or instructions configured for computing device 1300. Processor(s) 1302 (e.g., a hardware processor) can execute any type of instructions associated with data to achieve the operations detailed herein. In one example, processor(s) 1302 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 1304 and/or storage 1306 is/are configured to store data, information, software, and/or instructions associated with computing device 1300, and/or logic configured for memory element(s) 1304 and/or storage 1306. For example, any logic described herein (e.g., control logic 1320) can, in various embodiments, be stored for computing device 1300 using any combination of memory element(s) 1304 and/or storage 1306. Note that in some embodiments, storage 1306 can be consolidated with one or more memory elements 1304 (or vice versa), or can overlap/exist in any other suitable manner.

In at least one embodiment, bus 1308 can be configured as an interface that enables one or more elements of computing device 1300 to communicate in order to exchange information and/or data. Bus 1308 can be implemented with any architecture designed for passing control, data and/or information between processors, memory elements/storage, peripheral devices, and/or any other hardware and/or software components that may be configured for computing device 1300. In at least one embodiment, bus 1308 may be implemented as a fast kernel-hosted interconnect, potentially using shared memory between processes (e.g., logic), which can enable efficient communication paths between the processes.

In various embodiments, network processor unit(s) 1310 may enable communication between computing device 1300 and other systems, entities, etc., via network I/O interface(s) 1312 to facilitate operations discussed for various embodiments described herein. In various embodiments, network processor unit(s) 1310 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1300 and other systems, entities, etc. to facilitate operations for various embodiments described herein. In various embodiments, network I/O interface(s) 1312 can be configured as one or more Ethernet port(s), Fibre Channel ports, and/or any other I/O port(s) now known or hereafter developed. Thus, the network processor unit(s) 1310 and/or network I/O interface(s) 1312 may include suitable interfaces for receiving, transmitting, and/or otherwise communicating data and/or information in a network environment.

I/O interface(s) 1314 allow for input and output of data and/or information with other entities that may be connected to computing device 1300. For example, I/O interface(s) 1314 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a display 1316 such as a computer monitor, a display screen, or the like.

In various embodiments, control logic 1320 can include instructions that, when executed, cause processor(s) 1302 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, an apparatus is provided. The apparatus includes a memory, a network interface configured to enable network communications, and a processor. The processor is configured to perform a method including obtaining a plurality of notifications related to a plurality of network issues and generating meta-semantic data including a summary of each of the plurality of notifications. The method further includes obtaining inventory data of a plurality of network devices in a plurality of domains of a network. The inventory data includes configuration information of the plurality of network devices. The method further includes generating a multi-level hierarchical summary specific to the network based on the inventory data and the meta-semantic data. The multi-level hierarchical summary includes a first level specific to one or more affected network devices from the plurality of network devices and a second level specific to a group of network devices from the plurality of network devices. The method further includes providing the multi-level hierarchical summary for performing one or more actions associated with the network.

In yet another example embodiment, one or more non-transitory computer readable storage media encoded with instructions are provided. When the media is executed by a processor, the instructions cause the processor to execute a method that includes obtaining a plurality of notifications related to a plurality of network issues and generating meta-semantic data including a summary of each of the plurality of notifications. The method further includes obtaining inventory data of a plurality of network devices in a plurality of domains of a network. The inventory data includes configuration information of the plurality of network devices. The method further includes generating a multi-level hierarchical summary specific to the network based on the inventory data and the meta-semantic data. The multi-level hierarchical summary includes a first level specific to one or more affected network devices from the plurality of network devices and a second level specific to a group of network devices from the plurality of network devices. The method further includes providing the multi-level hierarchical summary for performing one or more actions associated with the network.

In yet another example embodiment, a system is provided that includes the devices and operations explained above with reference to FIGS. 1-13.

The programs described herein (e.g., control logic 1320) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 1306 and/or memory elements(s) 1304 can store data, software, code, instructions (e.g., processor instructions), logic, parameters, combinations thereof, and/or the like used for operations described herein. This includes the storage 1306 and/or memory elements(s) 1304 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer usable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    obtaining a plurality of notifications related to a plurality of network issues;
    generating meta-semantic data comprising a summary of each of the plurality of notifications;
    obtaining inventory data of a plurality of network devices in a plurality of domains of a network, the inventory data including configuration information of the plurality of network devices;
    generating a multi-level hierarchical summary specific to the network based on the inventory data and the meta-semantic data, wherein the multi-level hierarchical summary includes a first level specific to one or more affected network devices from the plurality of network devices and a second level specific to a group of network devices including the one or more affected network devices and at least one other network device from the plurality of network devices that is related to the one or more affected network devices based on a device type, a specific configuration, and/or a network service, and wherein the summary of each of the plurality of notifications is shorter at the second level than the first level based on a set of rules; and
    providing the multi-level hierarchical summary for performing one or more actions associated with the network.

2. The method of claim 1, wherein each summary report includes at least one actionable task to mitigate a respective issue from the plurality of network issues identified in a respective summary report.

3. The method of claim 2, further comprising:
    changing, by a computing device, a configuration of at least one of the one or more affected network devices by performing the at least one actionable task in a first summary report of the first level that includes a first summary about the plurality of notifications or a second summary report of the second level that includes a second summary about the plurality of notifications.

4. The method of claim 1, wherein generating the multi-level hierarchical summary specific to the network includes:
    generating a third level specific to a network domain of the plurality of domains of the network, the third level includes a list of affected network devices of the network domain, a description and impact for each of one or more network issues in the network domain, and at least one actionable task to mitigate the one or more network issues in the network domain.

5. The method of claim 1, wherein generating the meta-semantic data includes:
    generating a plurality of short summaries for a respective notification of the plurality of notifications;
    selecting one short summary from the plurality of short summaries using contrastive learning;
    determining a plurality of metrics related to a respective network issue described in the respective notification; and
    generating an individual summary for the respective notification, the individual summary includes the one short summary and the plurality of metrics related to the respective network issue.

6. The method of claim 5, wherein generating the plurality of short summaries includes:
    performing prompt learning of the respective notification in which at least one trigger token is selected from a section within the respective notification and at least a portion of a text in the section is concatenated based on the at least one trigger token.

7. The method of claim 6, wherein the plurality of metrics include an urgency score and a severity score of the respective network issue and selecting the one short summary includes:
    performing the contrastive learning of the plurality of short summaries by determining one or more features of a respective short summary from the plurality of short summaries and one or more relationships to other short summaries of the plurality of short summaries.

8. The method of claim 6, further comprising:
    reorganizing unstructured data in the respective notification into a predetermined format of a first notification type, wherein the respective notification is a new notification type different from the first notification type and is unknown for generating the at least one trigger token.

9. The method of claim 1, wherein the first level and the second level each includes a plurality of metric values comprising a severity score, an urgency score, and one or more keywords, and wherein generating the meta-semantic data includes:
  encoding data of a respective notification of the plurality of notifications to generate encoded data; and
  linguistically processing the encoded data using a plurality of prediction heads, each of the plurality of prediction heads includes a neural network tuned to generate a specific metric value of the plurality of metric values.

10. The method of claim 1, wherein the first level and the second level each includes a set of network issues from the plurality of network issues, each of the set of network issues includes at least one metric value and at least one actionable task to mitigate a respective issue and further comprising:
  prioritizing the set of network issues based on semantic meanings, statuses of the one or more affected network devices, and the at least one metric value.

11. The method of claim 10, wherein the set of network issues includes one or more of:
  a security related vulnerability detected in the network,
  a defect associated with the one or more affected network devices, or
  a network connectivity advisory.

12. The method of claim 1, wherein each of the first level and the second level includes a plurality of metric values and wherein generating the meta-semantic data includes:
  generating the plurality of metric values using a plurality of prediction heads, wherein each prediction head generates a specific metric value of the plurality of metric values.

13. The method of claim 1, wherein generating the meta-semantic data comprises:
  reorganizing unstructured data in a respective notification of the plurality of notifications into a predetermined format of a first notification type, wherein the respective notification is a new notification type different from the first notification type.

14. The method of claim 1, wherein generating the multi-level hierarchical summary further includes:
  determining at least two group levels for summarizing the plurality of notifications based on the set of rules.

15. An apparatus comprising:
  a memory;
  a network interface configured to enable network communications; and
  a processor, wherein the processor is configured to perform a method comprising:
    obtaining a plurality of notifications related to a plurality of network issues;
    generating meta-semantic data comprising a summary of each of the plurality of notifications;
    obtaining inventory data of a plurality of network devices in a plurality of domains of a network, the inventory data including configuration information of the plurality of network devices;
    generating a multi-level hierarchical summary specific to the network based on the inventory data and the meta-semantic data, wherein the multi-level hierarchical summary includes a first level specific to one or more affected network devices from the plurality of network devices and a second level specific to a group of network devices including the one or more affected network devices and at least one other network device from the plurality of network devices that is related to the one or more affected network devices based on a device type, a specific configuration, and/or a network service, and wherein the summary of each of the plurality of notifications is shorter at the second level than the first level based on a set of rules; and
    providing the multi-level hierarchical summary for performing one or more actions associated with the network.

16. The apparatus of claim 15, wherein the processor is configured to generate the multi-level hierarchical summary specific to the network by:
  generating a third level specific to a network domain of the plurality of domains of the network, the third level includes a list of affected network devices of the network domain, a description and impact for each of one or more network issues in the network domain, and at least one actionable task to mitigate the one or more network issues in the network domain.

17. The apparatus of claim 15, wherein the processor is further configured to generate the meta-semantic data by:
  generating a plurality of short summaries for a respective notification of the plurality of notifications;
  selecting one short summary from the plurality of short summaries using contrastive learning;
  determining a plurality of metrics related to a respective network issue described in the respective notification; and
  generating an individual summary for the respective notification, the individual summary includes the one short summary and the plurality of metrics related to the respective network issue.

18. One or more non-transitory computer readable storage media encoded with software comprising computer executable instructions that, when executed by a processor, cause the processor to perform a method including:
  obtaining a plurality of notifications related to a plurality of network issues;
  generating meta-semantic data comprising a summary of each of the plurality of notifications;
  obtaining inventory data of a plurality of network devices in a plurality of domains of a network, the inventory data including configuration information of the plurality of network devices;
  generating a multi-level hierarchical summary specific to the network based on the inventory data and the meta-semantic data, wherein the multi-level hierarchical summary includes a first level specific to one or more affected network devices from the plurality of network devices and a second level specific to a group of network devices including the one or more affected network devices and at least one other network device from the plurality of network devices and each of the first level and the second level includes a plurality of metric values; and
  providing the multi-level hierarchical summary for performing one or more actions associated with the network,
  wherein generating the meta-semantic data includes generating the plurality of metric values using a plurality of prediction heads, each prediction head generating a specific metric value of the plurality of metric values.

19. The one or more non-transitory computer readable storage media according to claim 18, wherein the first level is a first summary report and the second level is a second summary report, each including at least one actionable task to mitigate a respective issue from the plurality of network issues identified in a respective summary report.

20. The one or more non-transitory computer readable storage media according to claim 19, wherein the computer executable instructions cause the processor to further perform:
 changing a configuration of at least one of the one or more affected network devices by performing the at least one actionable task in the first summary report or the second summary report.

* * * * *